(12) United States Patent
Nakamura et al.

(10) Patent No.: US 10,053,536 B2
(45) Date of Patent: Aug. 21, 2018

(54) ANTISTATIC RESIN COMPOSITION, AND CONTAINER AND PACKAGING MATERIAL WHICH USE SAME

(71) Applicant: ADEKA CORPORATION, Tokyo (JP)

(72) Inventors: Tatsuhito Nakamura, Saitama (JP); Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/540,072

(22) PCT Filed: Dec. 8, 2015

(86) PCT No.: PCT/JP2015/084430
§ 371 (c)(1),
(2) Date: Jun. 27, 2017

(87) PCT Pub. No.: WO2016/117233
PCT Pub. Date: Jul. 28, 2016

(65) Prior Publication Data
US 2017/0349703 A1    Dec. 7, 2017

(30) Foreign Application Priority Data

Jan. 19, 2015  (JP) ................. 2015-007877
Jan. 26, 2015  (JP) ................. 2015-012643
Jan. 26, 2015  (JP) ................. 2015-012644

(51) Int. Cl.
| | |
|---|---|
| C08K 3/16 | (2006.01) |
| C08G 63/672 | (2006.01) |
| C08K 5/098 | (2006.01) |
| C08K 5/42 | (2006.01) |
| C08L 101/00 | (2006.01) |
| C08L 23/00 | (2006.01) |
| C08L 25/00 | (2006.01) |
| C08L 67/02 | (2006.01) |
| C09K 3/16 | (2006.01) |

(52) U.S. Cl.
CPC .............. *C08G 63/672* (2013.01); *C08K 3/16* (2013.01); *C08K 5/098* (2013.01); *C08K 5/42* (2013.01); *C08L 23/00* (2013.01); *C08L 25/00* (2013.01); *C08L 67/02* (2013.01); *C08L 101/00* (2013.01); *C09K 3/16* (2013.01)

(58) Field of Classification Search
USPC ........................................................ 529/298
See application file for complete search history.

(56) References Cited

U.S. PATENT DOCUMENTS

| | | | |
|---|---|---|---|
| 4,055,393 | A | 10/1977 | Schafer et al. |
| 2005/0136271 | A1 | 6/2005 | Germroth et al. |
| 2015/0353796 | A1 | 12/2015 | Nakamura et al. |
| 2016/0289375 | A1 | 10/2016 | Nakamura et al. |

FOREIGN PATENT DOCUMENTS

| | | | |
|---|---|---|---|
| EP | 3 173 454 A1 | 5/2017 | |
| JP | 51-122020 A | 10/1976 | |
| JP | 6-57153 A | 3/1994 | |
| JP | 8-12755 A | 1/1996 | |
| JP | 8-134309 A | 5/1996 | |
| JP | 10-152606 A | 6/1998 | |
| JP | 2001-89750 A | 4/2001 | |
| JP | 2001-278985 A | 10/2001 | |
| JP | 2006-299494 A | 11/2006 | |
| JP | 2007-39658 A | 2/2007 | |
| JP | 2007-516867 A | 6/2007 | |
| JP | 2011-225634 A | 11/2011 | |
| JP | 2012-62067 A | 3/2012 | |
| JP | 2016-23254 A | 2/2016 | |
| WO | WO 98/44069 A1 | 10/1998 | |
| WO | WO 2014/115745 A1 | 7/2014 | |
| WO | WO 2014/148454 A | 9/2014 | |

OTHER PUBLICATIONS

International Search Report for PCT/JP2015/084430 (PCT/ISA/210) dated Mar. 1, 2016.
Written Opinion of the International Searching Authority for PCT/JP2015/084430 (PCT/ISA/237) dated Mar. 1, 2016.

*Primary Examiner* — Terressa Boykin
(74) *Attorney, Agent, or Firm* — Birch, Stewart, Kolasch & Birch, LLP

(57) ABSTRACT

Provided are: an antistatic resin composition which not only has long-lasting and sufficient antistaticity and shows hardly any ion elution when made into a molded article but also is suitable for containers and packaging materials for storage and transport of electrical/electronic components; and a container and a packaging material which comprise the same. The antistatic resin composition includes, with respect to 100 parts by mass of a synthetic resin, 3 to 20 parts by mass of at least one polymer compound (E) and 0.1 to 5 parts by mass of at least one alkali metal salt (F). The polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and a compound (D) having a reactive functional group are bound via ester bonds, or ester bonds and amide bonds:

—CH$_2$—CH$_2$—O—                          (1).

13 Claims, No Drawings

ANTISTATIC RESIN COMPOSITION, AND CONTAINER AND PACKAGING MATERIAL WHICH USE SAME

TECHNICAL FIELD

The present invention relates to an antistatic resin composition (hereinafter, also simply referred to as "resin composition") as well as a container and a packaging material which comprise the same. More particularly, the present invention relates to: an antistatic resin composition which not only has long-lasting and sufficient antistaticity and shows hardly any ion elution when made into a molded article but also is suitable for containers and packaging materials for storage and transport of electrical/electronic components; and a container and a packaging material which comprise the same.

BACKGROUND ART

In electrical and electronic instruments, electrical components and/or electronic components (hereinafter, referred to as "electrical/electronic components"), such as silicon wafers, hard disks, disk substrates, glass substrates, IC chips, semiconductors, optical memory disks, color filters, hard disk magnetic head elements and CCD elements, are used. In the assembly of electrical and electronic instruments, in order to supply such components to the assembly line, it is necessary to transfer or transport the components, and transport containers are used for such purpose. For housing and storage of the components as intermediate or final products, storage containers and packaging materials are used.

In the containers for transport of electrical/electronic components, containers for storage and packaging materials for packaging electrical/electronic components, conventionally, synthetic resins having excellent moldability and chemical resistance, such as polyolefin-based resins and polystyrene-based resins, are used.

In such electrical/electronic components, occurrence of static electricity presents major problems by causing failure and attracting fine dust and the like. Accordingly, in order to inhibit the occurrence of static electricity, the synthetic resins are imparted with antistaticity by incorporation of an antistatic agent. As the antistatic agent, the use of a polymer-type antistatic agent has been proposed for providing long-lasting antistaticity (for example, Patent Documents 1 to 5).

RELATED ART DOCUMENTS

Patent Documents

Patent Document 1: Japanese Unexamined Patent Application Publication No. 2012-62067
Patent Document 2: Japanese Unexamined Patent Application Publication No. H8-12755
Patent Document 3: Japanese Unexamined Patent Application Publication No. 2001-278985
Patent Document 4: WO 2014/115745
Patent Document 5: WO 2014/148454

SUMMARY OF THE INVENTION

Problems to be Solved by the Invention

Such polymer-type antistatic agents often contain an electrolyte such as an alkali metal salt for the purpose of improving the antistaticity and, when used in a container for storage/transport of an electrical/electronic component, an ion which elutes from the molded article is problematic. Meanwhile, when no electrolyte is contained, although elution of an ion is limited, there is a problem that sufficient antistatic performance cannot be attained. Therefore, at present, there is a demand for a resin composition which has long-lasting and sufficient antistaticity and elutes only a small amount of an ion. The present applicant has proposed antistatic resin compositions comprising a polyether ester-based polymer-type antistatic agent in Patent Documents 4 and 5; however, since these compositions do not contain any aromatic dicarboxylic acid, their structures are different from that of the polymer compound used in the present invention as an antistatic agent.

In view of the above, an object of the present invention is to provide: an antistatic resin composition which not only has long-lasting and sufficient antistaticity and shows hardly any ion elution when made into a molded article but also is suitable for containers and packaging materials for storage and transport of electrical/electronic components; and a container and a packaging material which comprise the same.

Means for Solving the Problems

The present inventors intensively studied to solve the above-described problems and discovered that the problems can be solved by using an antistatic polymer compound having a specific structure in combination with an alkali metal salt at a prescribed ratio, thereby completing the present invention.

That is, the antistatic resin composition of the present invention is characterized by comprising, with respect to 100 parts by mass of a synthetic resin: 3 to 20 parts by mass of at least one polymer compound (E); and 0.1 to 5 parts by mass of at least one alkali metal salt (F), wherein the polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and a compound (D) having a reactive functional group are bound via ester bonds, or ester bonds and amide bonds:

$$-CH_2-CH_2-O- \qquad (1)$$

In the antistatic resin composition of the present invention, it is preferred that the compound (D) having a reactive functional group is any one of a polyepoxy compound (D1) having two or more epoxy groups, a polyhydric alcohol compound (D2) having three or more hydroxyl groups and a polyamine compound (D3) having two or more amino groups; and that the polymer compound (E) has a structure in which a polyester (A), which is constituted by a diol, an aliphatic dicarboxylic acid and an aromatic dicarboxylic acid, the compound (B) and the compound (D) having a reactive functional group are bound via ester bonds, or ester bonds and amide bonds.

In the antistatic resin composition of the present invention, it is also preferred that the polymer compound (E) has a structure in which a block polymer (C) having carboxyl groups at both ends and the compound (D) having a reactive functional group are bound via an ester bond or an amide bond, the block polymer (C) comprising a block constituted by the polyester (A) and a block constituted by the compound (B) that are repeatedly and alternately bound via ester bonds.

Further, in the antistatic resin composition of the present invention, it is preferred that the polyester (A) constituting the polymer compound (E) has a structure comprising carboxyl groups at both ends.

Still further, in the antistatic resin composition of the present invention, it is preferred that, in the polymer compound (E), the block constituted by the polyester (A) has a number-average molecular weight of 800 to 8,000 in terms of polystyrene; the block constituted by the compound (B) has a number-average molecular weight of 400 to 6,000 in terms of polystyrene; and the block polymer (C) has a number-average molecular weight of 5,000 to 25,000 in terms of polystyrene.

Yet still further, in the antistatic resin composition of the present invention, it is preferred that the compound (B) constituting the polymer compound (E) is a polyethylene glycol; and that the synthetic resin is at least one selected from the group consisting of polyolefin-based resins and polystyrene-based resins.

The container and the packaging material of the present invention are characterized in that they are obtained by molding the antistatic resin composition of the present invention.

In the container and the packaging material of the present invention, it is preferred that, when the container and the packaging material are immersed in 100 g of 40° C. water for 2 hours, the amount of sodium and lithium ions eluting therefrom is 12 ppb or less per 1 cm$^2$ of the surface area.

Effects of the Invention

According to the present invention, an antistatic resin composition which not only has long-lasting and sufficient antistaticity and shows hardly any ion elution when made into a molded article but also is suitable for containers and packaging materials for storage and transport of electrical/electronic components, as well as a container and a packaging material which comprise the same, can be provided.

MODE FOR CARRYING OUT THE INVENTION

The antistatic resin composition of the present invention, the container of the present invention and the packaging material of the present invention will now be described in detail.

First, the antistatic resin composition of the present invention will be described. The antistatic resin composition of the present invention comprises, with respect to 100 parts by mass of a synthetic resin: 3 to 20 parts by mass of at least one polymer compound (E); and 0.1 to 5 parts by mass of at least one alkali metal salt (F). In the resin composition of the present invention, the polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and a compound (D) having a reactive functional group are bound via ester bonds, or ester bonds and amide bonds:

(1)

The synthetic resin used in the present invention will now be described. The resin used in the resin composition of the present invention is not particularly restricted as long as it is a synthetic resin; however, the resin is preferably a thermoplastic resin, particularly preferably a polyolefin-based resin or a polystyrene-based resin.

Examples of the polyolefin-based resin include α-olefin polymers, such as low-density polyethylenes, linear low-density polyethylenes, high-density polyethylenes, homopolypropylenes, random copolymer polypropylenes, block copolymer polypropylenes, isotactic polypropylenes, syndiotactic polypropylenes, hemi-isotactic polypropylenes, polybutenes, cycloolefin polymers, stereo block polypropylenes, poly-3-methyl-1-butene, poly-3-methyl-1-pentene and poly-4-methyl-1-pentene; α-olefin copolymers, such as ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers and ethylene-vinyl acetate copolymers; and polyolefin-based thermoplastic elastomers, and the polyolefin-based resin may be a copolymer of two or more thereof. These polyolefin-based resins may be used in combination of two or more thereof.

Examples of the polystyrene-based resin include copolymers of vinyl group-containing aromatic hydrocarbons alone, and copolymers of a vinyl group-containing aromatic hydrocarbon and other monomer(s) (e.g., maleic anhydride, phenylmaleimide, (meth)acrylate, butadiene and/or (meth)acrylonitrile), for example, thermoplastic resins, such as polystyrene (PS) resins, high-impact polystyrenes (HIPS), acrylonitrile-styrene (AS) resins, acrylonitrile-butadiene-styrene (ABS) resins, methyl methacrylate-butadiene-styrene (MBS) resins, heat-resistant ABS resins, acrylonitrile-acrylate-styrene (AAS) resins, styrene-maleic anhydride (SMA) resins, methacrylate-styrene (MS) resins, styrene-isoprene-styrene (SIS) resins, acrylonitrile-ethylene-propylene rubber-styrene (AES) resins, styrene-butadiene-butylene-styrene (SBBS) resins and methyl methacrylate-acrylonitrile-butadiene-styrene (MABS) resins; and hydrogenated styrene-based elastomer resins obtained by hydrogenation of the double bond of butadiene or isoprene in the above-described resins, such as styrene-ethylene-butylene-styrene (SEBS) resins, styrene-ethylene-propylene-styrene (SEPS) resins, styrene-ethylene-propylene (SEP) resins and styrene-ethylene-ethylene-propylene-styrene (SEEPS) resins. These polystyrene-based resins may be used in combination of two or more thereof.

In the resin composition of the present invention, as synthetic resins other than the polyolefin-based resin and polystyrene-based resin, for example, halogen-containing resins, such as polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polyvinyl acetates; acrylic resins; polymethyl methacrylates; polyvinyl alcohols; polyvinyl formals; polyvinyl butyrals; aromatic polyesters such as polyalkylene terephthalates (e.g., polyethylene terephthalate, polybutylene terephthalate and polycyclohexane dimethylene terephthalate) and polyalkylene naphthalates such as polyethylene naphthalate and polybutylene naphthalate, and linear polyesters such as polytetramethylene terephthalate; degradable aliphatic polyesters, such as polyhydroxy butyrate, polycaprolactone, polybutylene succinate, polyethylene succinate, polylactic acid, polymalic acid, polyglycolic acid, polydioxane and poly(2-oxetanone); and thermoplastic resins and blends thereof, such as polyamides (e.g., polyphenylene oxide, polycaprolactam and polyhexamethylene adipamide), polycarbonates, polycarbonate/ABS resins, branched polycarbonates, polyacetals, polyphenylene sulfides, polyurethanes, cellulose-based resins, polyimide resins, polysulfones, polyphenylene ethers, polyether ketones, polyether ether ketones and liquid crystal polymers, can be used. Further, elastomers such as isoprene rubbers, butadiene rubbers, acrylonitrile-butadiene copolymer rubbers, styrene-butadiene copolymer rubbers, fluorocarbon rubbers, silicone rubbers, polyester-based elastomers, nitrile-based elastomers, nylon-based elastomers, vinyl chloride-based elastomers, polyamide-based elastomers and polyurethane-based elastomers may also be used.

In the resin composition of the present invention, these synthetic resins may be used individually, or two or more thereof may be used in combination. Moreover, these synthetic resins may be alloyed as well. These synthetic resins can be used regardless of molecular weight, polymerization degree, density, softening point, ratio of solvent-insoluble component(s), degree of stereoregularity, presence or absence of catalyst residue, type and blend ratio of each material monomer, type of polymerization catalyst (e.g., a Ziegler catalyst or a metallocene catalyst).

Next, the polymer compound (E) used in the present invention will be described. The polymer compound (E) is incorporated for the purpose of imparting antistaticity to the resin composition of the present invention.

As described above, the polymer compound (E) used in the present invention has a structure in which a diol, an aliphatic dicarboxylic acid, an aromatic dicarboxylic acid, a compound (B) which comprises at least one group represented by the following Formula (1) and has hydroxyl groups at both ends, and a compound (D) having a reactive functional group are bound via ester bonds, or ester bonds and amide bonds:

  (1)

The polymer compound (E) can be obtained by, for example, allowing a diol, an aliphatic dicarboxylic acid, an aromatic dicarboxylic acid, a compound (B) which comprises at least one group represented by the Formula (1) and has hydroxyl groups at both ends, and a compound (D) having a reactive functional group to undergo an esterification reaction and an amidation reaction.

First, the diol used in the present invention will be described.

Examples of the diol used in the present invention include aliphatic diols and aromatic group-containing diols. Two or more of these diols may be used in combination. Examples of the aliphatic diols include 1,2-ethanediol (ethylene glycol), 1,2-propanediol (propylene glycol), 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexane dimethanol, hydrogenated bisphenol A, 1,2-, 1,3- or 1,4-cyclohexanediol, cyclododecanediol, dimer diol, hydrogenated dimer diol, diethylene glycol, dipropylene glycol, triethylene glycol and polyethylene glycol. Among these aliphatic diols, 1,4-cyclohexane dimethanol and hydrogenated bisphenol A are preferred from the standpoints of antistaticity and inhibition of ion elution, and 1,4-cyclohexane dimethanol is more preferred.

The aliphatic diols are preferably hydrophobic; therefore, among aliphatic diols, hydrophilic polyethylene glycols are not preferred. This, however, does not apply to those cases where they are used in combination with other diol.

Examples of the aromatic group-containing diols include polyhydroxyethyl adducts of mononuclear dihydric phenol compounds, such as bisphenol A, 1,2-hydroxybenzene, 1,3-hydroxybenzene, 1,4-hydroxybenzene, 1,4-benzenedimethanol, bisphenol A-ethylene oxide adducts, bisphenol A-propylene oxide adduct, 1,4-bis(2-hydroxyethoxy)benzene, resorcin and pyrocatechol. Among these aromatic group-containing diols, bisphenol A-ethylene oxide adducts and 1,4-bis(β-hydroxyethoxy)benzene are preferred.

Next, the aliphatic dicarboxylic acid used in the present invention will be described.

The aliphatic dicarboxylic acid used in the present invention may be a derivative (such as an acid anhydride, an alkyl ester, an alkali metal salt or an acid halide) of an aliphatic dicarboxylic acid. Further, two or more aliphatic dicarboxylic acids and derivatives thereof may be used in combination.

The aliphatic dicarboxylic acid is preferably, for example, an aliphatic dicarboxylic acid having 2 to 20 carbon atoms, examples of which include oxalic acid, malonic acid, succinic acid, glutaric acid, adipic acid, pimelic acid, suberic acid, azelaic acid, sebacic acid, 1,10-decanedicarboxylic acid, 1,4-cyclohexanedicarboxylic acid, dimer acid, maleic acid and fumaric acid. Among these aliphatic dicarboxylic acids, from the standpoints of the melting point and heat resistance, ones having 4 to 16 carbon atoms are preferred, and ones having 6 to 12 carbon atoms are more preferred.

Next, the aromatic dicarboxylic acid used in the present invention will be described.

The aromatic dicarboxylic acid used in the present invention may be a derivative (such as an acid anhydride, an alkyl ester, an alkali metal salt or an acid halide) of an aromatic dicarboxylic acid. Further, two or more aromatic dicarboxylic acids and derivatives thereof may be used in combination.

The aromatic dicarboxylic acid is preferably, for example, an aromatic dicarboxylic acid having 8 to 20 carbon atoms, examples of which include terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Next, the compound (B) used in the present invention, which comprises at least one group represented by the Formula (1) and has hydroxyl groups at both ends, will be described.

The compound (B) which comprises at least one group represented by the Formula (1) and has hydroxyl groups at both ends is preferably a hydrophilic compound, more preferably a polyether having the group represented by the Formula (1), particularly preferably a polyethylene glycol represented by the following Formula (2):

  (2)

In the Formula (2), m represents a number of 5 to 250. From the standpoints of the heat resistance and compatibility, m is preferably 20 to 150.

Examples of the compound (B) include polyethylene glycols obtained by addition reaction of ethylene oxide; and polyethers obtained by addition reaction of ethylene oxide and at least one other alkylene oxide (e.g., propylene oxide, or 1,2-, 1,4-, 2,3- or 1,3-butylene oxide), which may be random or block polyethers.

Examples of the compound (B) also include compounds having a structure in which ethylene oxide is added to an active hydrogen atom-containing compound; and compounds having a structure in which ethylene oxide and at least one other alkylene oxide (e.g., propylene oxide, or 1,2-, 1,4-, 2,3- or 1,3-butylene oxide) are added. The addition in these compounds may be random or block addition.

The active hydrogen atom-containing compound is, for example, a glycol, a dihydric phenol, a primary monoamine, a secondary diamine or a dicarboxylic acid.

As the glycol, aliphatic glycols having 2 to 20 carbon atoms, alicyclic glycols having 5 to 12 carbon atoms and aromatic glycols having 8 to 26 carbon atoms can be used.

Examples of the aliphatic glycols include ethylene glycol, 1,2-propylene glycol, 1,3-propanediol, 1,2-butanediol, 1,3-butanediol, 1,4-butanediol, 1,3-hexanediol, 1,4-hexanediol, 1,6-hexanediol, 2,5-hexanediol, 1,2-octanediol, 1,8-octanediol, 1,10-decanediol, 1,18-octadecanediol, 1,20-eicosanediol, diethylene glycol, triethylene glycol, and thiodiethylene glycol.

Examples of the alicyclic glycols include 1-hydroxymethyl-1-cyclobutanol, 1,2-cyclohexanediol, 1,3-cyclohexanediol, 1,4-cyclohexanediol, 1-methyl-3,4-cyclohexanediol, 2-hydroxymethylcyclohexanol, 4-hydroxymethylcyclohexanol, 1,4-cyclohexane dimethanol, and 1,1'-dihydroxy-1,1'-dicyclohexanol.

Examples of the aromatic glycols include dihydroxymethylbenzene, 1,4-bis(β-hydroxyethoxy)benzene, 2-phenyl-1,3-propanediol, 2-phenyl-1,4-butanediol, 2-benzyl-1,3-propanediol, triphenylethylene glycol, tetraphenylethylene glycol, and benzopinacol.

As the dihydric phenol, a phenol having 6 to 30 carbon atoms can be used, and examples thereof include catechol, resorcinol, 1,4-dihydroxybenzene, hydroquinone, bisphenol A, bisphenol F, bisphenol S, dihydroxydiphenyl ether, dihydroxydiphenyl thioether, binaphthol, and alkyl (C1 to C10) or halogen substitution products of these phenols. Examples of the primary monoamine include aliphatic primary monoamines having 1 to 20 carbon atoms, such as methylamine, ethylamine, n-propylamine, isopropylamine, n-butylamine, s-butylamine, isobutylamine, n-amylamine, isoamylamine, n-hexylamine, n-heptylamine, n-octylamine, n-decylamine, n-octadecylamine and n-eicosylamine.

Examples of the secondary diamine include aliphatic secondary diamines having 4 to 18 carbon atoms, heterocyclic secondary diamines having 4 to 13 carbon atoms, alicyclic secondary diamines having 6 to 14 carbon atoms, aromatic secondary diamines having 8 to 14 carbon atoms, and secondary alkanoldiamines having 3 to 22 carbon atoms.

Examples of the aliphatic secondary diamines include N,N'-dimethylethylenediamine, N,N'-diethylethylenediamine, N,N'-dibutylethylenediamine, N,N'-dimethylpropylenediamine, N,N'-diethylpropylenediamine, N,N'-dibutylpropylenediamine, N,N'-dimethyltetramethylenediamine, N,N'-diethyltetramethylenediamine, N,N'-dibutyltetramethylenediamine, N,N'-dimethylhexamethylenediamine, N,N'-diethylhexamethylenediamine, N,N'-dibutylhexamethylenediamine, N,N'-dimethyldecamethylenediamine, N,N'-diethyldecamethylenediamine, and N,N'-dibutyldecamethylenediamine.

Examples of the heterocyclic secondary diamines include piperazine and 1-aminopiperidine.

Examples of the alicyclic secondary diamines include N,N'-dimethyl-1,2-cyclobutanediamine, N,N'-diethyl-1,2-cyclobutanediamine, N,N'-dibutyl-1,2-cyclobutanediamine, N,N'-dimethyl-1,4-cyclohexanediamine, N,N'-diethyl-1,4-cyclohexanediamine, N,N'-dibutyl-1,4-cyclohexanediamine, N,N'-dimethyl-1,3-cyclohexanediamine, N,N'-diethyl-1,3-cyclohexanediamine, and N,N'-dibutyl-1,3-cyclohexanediamine.

Examples of the aromatic secondary diamines include N,N'-dimethyl-phenylenediamine, N,N'-dimethyl-xylylenediamine, N,N'-dimethyl-diphenylmethanediamine, N,N'-dimethyl-diphenyl ether diamine, N,N'-dimethyl-benzidine, and N,N'-dimethyl-1,4-naphthalenediamine.

Examples of the secondary alkanoldiamines include N-methyldiethanolamine, N-octyldiethanolamine, N-stearyldiethanolamine, and N-methyldipropanolamine. Examples of the dicarboxylic acid include dicarboxylic acids having 2 to 20 carbon atoms, such as aliphatic dicarboxylic acids, aromatic dicarboxylic acids and alicyclic dicarboxylic acids.

Examples of the aliphatic dicarboxylic acids include oxalic acid, malonic acid, succinic acid, glutaric acid, methylsuccinic acid, dimethylmalonic acid, β-methylglutaric acid, ethylsuccinic acid, isopropylmalonic acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, hexadecanedicarboxylic acid, octadecanedicarboxylic acid, and eicosanedicarboxylic acid.

Examples of the aromatic dicarboxylic acids include terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Examples of the alicyclic dicarboxylic acids include 1,3-cyclopentanedicarboxylic acid, 1,2-cyclopentanedicarboxylic acid, 1,4-cyclohexanedicarboxylic acid, 1,2-cyclohexanedicarboxylic acid, 1,3-cyclohexanedicarboxylic acid, 1,4-cyclohexanediacetic acid, 1,3-cyclohexanediacetic acid, 1,2-cyclohexanediacetic acid, and dicyclohexyl-4,4'-dicarboxylic acid.

These active hydrogen atom-containing compounds may be used individually, or two or more thereof may be used in combination.

Next, the compound (D) used in the present invention, which has a reactive functional group, will be described. In the present invention, as the compound (D) having a reactive functional group, any one of a polyepoxy compound (D1) having two or more epoxy groups, a polyhydric alcohol compound (D2) having three or more hydroxyl groups and a polyamine compound (D3) having two or more amino groups can be suitably used.

Next, the polyepoxy compound (D1) used in the present invention, which has two or more epoxy groups, will be described.

The polyepoxy compound (D1) used in the present invention is not particularly restricted as long as it has two or more epoxy groups, and examples of such a polyepoxy compound include polyglycidyl ether compounds of mononuclear polyhydric phenol compounds, such as hydroquinone, resorcin, pyrocatechol and phloroglucinol; polyglycidyl ether compounds of polynuclear polyhydric phenol compounds, such as dihydroxynaphthalene, biphenol, methylene bisphenol (bisphenol F), methylene bis(o-cresol), ethylidene bisphenol, isopropylidene bisphenol (bisphenol A), isopropylidene bis(o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, o-cresol novolac, ethylphenol novolac, butylphenol novolac, octylphenol novolac, resorcin novolac and terpene phenol; polyglycidyl ethers of polyhydric alcohols, such as ethylene glycol, propylene glycol, butylene glycol, hexanediol, polyethylene glycol, polyglycol, thiodiglycol, glycerin, trimethylolpropane, pentaerythritol, sorbitol and bisphenol A-ethylene oxide adducts; homo- or co-polymers of glycidyl ester of an aliphatic, aromatic or alicyclic polybasic acid, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid or endomethylene tetrahydrophthalic acid, and glycidyl methacrylate; glycidylamino group-containing epoxy compounds, such as N,N-diglycidyl aniline, bis(4-(N-methyl-N-glycidylamino)phenyl)methane and diglycidyl o-toluidine; epoxidized cyclic olefin compounds, such as vinylcyclohexene diepoxide, dicyclopentadiene diepoxide, 3,4-epoxycyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl)adipate; epoxidized conjugated diene polymers, such as epoxidized polybutadienes and epoxidized styrene-butadiene copolymers; heterocyclic compounds such as triglycidyl isocyanurate; and epoxidized soybean oil. These epoxy compounds may be internally cross-linked by a prepolymer of terminal isocyanate, or may be allowed to have a high molecular weight using a multivalent active hydrogen compound (e.g., a polyhydric phenol, a polyamine, a carbonyl group-containing compound or a polyphosphoric acid ester). As the polyepoxy compound (D1), two or more of these epoxy compounds may be used in combination.

Next, the polyhydric alcohol compound (D2) used in the present invention, which has three or more hydroxyl groups, will be described.

The polyhydric alcohol compound (D2) used in the present invention is not particularly restricted as long as it has three or more hydroxyl groups, and examples of such a polyhydric alcohol compound include trihydric alcohols, such as glycerin, 1,2,3-butanetriol, 1,2,4-butanetriol, 2-methyl-1,2,3-propanetriol, 1,2,3-pentanetriol, 1,2,4-pentanetriol, 1,3,5-pentanetriol, 2,3,4-pentanetriol, 2-methyl-2,3,4-butanetriol, trimethylolethane, 2,3,4-hexanetriol, 2-ethyl-1,2,3-butanetriol, trimethylolpropane, 4-propyl-3,4,5-heptanetriol, 2,4-dimethyl-2,3,4-pentanetriol, triethanolamine, triisopropanolamine and 1,3,5-tris(2-hydroxyethyl) isocyanurate; tetrahydric alcohols, such as pentaerythritol, 1,2,3,4-pentanetetrol, 2,3,4,5-hexanetetrol, 1,2,4,5-pentanetetrol, 1,3,4,5-hexanetetrol, diglycerin, ditrimethylolpropane, sorbitan, N,N,N',N'-tetrakis(2-hydroxypropyl)ethylene diamine and N,N,N',N'-tetrakis(2-hydroxyethyl)ethylene diamine; pentahydric alcohols, such as adonitol, arabitol, xylitol and triglycerin; hexahydric alcohols, such as dipentaerythritol, sorbitol, mannitol, iditol, inositol, dulcitol, talose and allose; and tripentaerythritol. The molecular weight of the polyhydric alcohol compound is not particularly restricted, a high-molecular-weight polyhydric alcohol such as polypentaerythritol or polyvinyl alcohol, or a synthetic polyhydric alcohol such as polyester polyol can also be used. As the polyhydric alcohol compound (D2), two or more of these alcohol compounds may be used in combination.

Next, the polyamine compound (D3) having two or more amino groups will be described.

The polyamine compound (D3) used in the present invention is not particularly restricted as long as it has two or more primary and/or secondary amino groups, and examples of such a polyamine compound include alkylene diamines (e.g., those having 2 to 12 carbon atoms), such as ethylene diamine, trimethylene diamine, hexamethylene diamine, heptamethylene diamine, octamethylene diamine and decamethylene diamine; aliphatic polyamines, such as 2,2',2"-triaminotriethylamine and bis(hexamethylene)triamine; polyalkylene polyamines (e.g., those in which alkylene groups have 2 to 6 carbon atoms and which has a polymerization degree of 2 to 5), such as diethylene triamine; alkane triamines, such as 1,6,11-undecanetriamine, 1,8-diamino-4-aminomethyloctane and 1,3,6-hexamethylenetriamine; heterocyclic polyamines whose alkylene groups have 2 to 6 carbon atoms, such as melamine, piperazine, N-aminoalkylpiperazines (e.g., N-aminoethylpiperazine) and the heterocyclic polyamines described in Japanese Patent Publication No. S55-21044; alicyclic polyamines (e.g., those having 4 to 20 carbon atoms), such as dicyclohexylmethanediamine, isophoronediamine and bicycloheptanetriamine; and aromatic polyamines (e.g., those having 6 to 20 carbon atoms), such as phenylenediamine, tolylenediamine, diethyltolylenediamine, xylylenediamine, diphenylmethane diamine, diphenyl ether diamine, polyphenylmethane polyamine and triphenylmethane triamine. As the polyamine compound (D3), two or more of these polyamine compounds may be used in combination.

From the standpoints of antistaticity and inhibition of ion elution, it is preferred that the polymer compound (E) has a structure in which a polyester (A), which is constituted by a diol, an aliphatic dicarboxylic acid and an aromatic dicarboxylic acid, the compound (B) and the compound (D) having a reactive functional group are bound via ester bonds, or ester bonds and amide bonds.

Further, from the standpoints of antistaticity and inhibition of ion elution, it is also preferred that the polymer compound (E) has a structure in which a block polymer (C) having carboxyl groups at both ends and the compound (D) having a reactive functional group are bound via an ester bond or an amide bond, the block polymer (C) comprising a block constituted by the polyester (A) constituted by a diol, an aliphatic dicarboxylic acid and an aromatic dicarboxylic acid and a block constituted by the compound (B), which blocks are repeatedly and alternately bound via ester bonds.

The polyester (A) according to the present invention may be any polyester as long as it is composed of a diol, an aliphatic dicarboxylic acid and an aromatic dicarboxylic acid, and it is preferred that the polyester (A) has a structure in which a residue obtained by removing a hydroxyl group from the diol and a residue obtained by removing a carboxyl group from the aliphatic dicarboxylic acid are bound via an ester bond and the residue obtained by removing a hydroxyl group from the diol and a residue obtained by removing a carboxyl group from the aromatic dicarboxylic acid are bound via an ester bond.

It is also preferred that the polyester (A) has a structure comprising carboxyl groups at both ends. Further, the polymerization degree of the polyester (A) is preferably in a range of 2 to 50.

The polyester (A) having carboxyl groups at both ends can be obtained by, for example, allowing the above-described aliphatic dicarboxylic acid and the above-described aromatic dicarboxylic acid to undergo a polycondensation reaction with the above-described diol.

The aliphatic dicarboxylic acid may be a derivative (such as an acid anhydride, an alkyl ester, an alkali metal salt or an acid halide) of an aliphatic dicarboxylic acid. In cases where the polyester (A) is obtained using such a derivative, both ends of the polyester (A) can eventually be treated to be carboxyl groups, and the polyester (A) in this state may be directly subjected to the subsequent reaction for obtaining the block polymer (C) having a structure comprising carboxyl groups at both ends. Further, two or more aliphatic dicarboxylic acids and derivatives thereof may be used in combination.

The aromatic dicarboxylic acid may be a derivative (such as an acid anhydride, an alkyl ester, an alkali metal salt or an acid halide) of an aromatic dicarboxylic acid. In cases where the polyester is obtained using such a derivative, both ends of the polyester can eventually be treated to be carboxyl groups, and the polyester in this state may be directly subjected to the subsequent reaction for obtaining the block polymer (C) having a structure comprising carboxyl groups at both ends. Further, two or more aromatic dicarboxylic acids and derivatives thereof may be used in combination.

In the polyester (A), the molar ratio of a residue excluding the carboxyl groups of the aliphatic dicarboxylic acid and the residue excluding the carboxyl groups of the aromatic dicarboxylic acid is preferably 90:10 to 99.9:0.1, more preferably 93:7 to 99.9:0.1.

The polyester (A) having carboxyl groups at both ends can be obtained by, for example, allowing the above-described aliphatic dicarboxylic acid or derivative thereof and the above-described aromatic dicarboxylic acid or derivative thereof to undergo a polycondensation reaction with the above-described diol.

As for the reaction ratio of the aliphatic dicarboxylic acid or derivative thereof and the aromatic dicarboxylic acid or derivative thereof with respect to the diol, it is preferred that the aliphatic dicarboxylic acid or derivative thereof and the aromatic dicarboxylic acid or derivative thereof is used in an excess amount, particularly in an excess of 1 mole in terms of molar ratio with respect to the diol, such that the resulting polyester has carboxyl groups at both ends.

In the polycondensation reaction, the compounding ratio of the aliphatic dicarboxylic acid or derivative thereof and the aromatic dicarboxylic acid or derivative thereof is, in terms of molar ratio, preferably 90:10 to 99.9:0.1, more preferably 93:7 to 99.9:0.1.

Depending on the compounding ratio and the reaction conditions, a polyester consisting of only the diol and the aliphatic dicarboxylic acid and a polyester consisting of only the diol and the aromatic dicarboxylic acid may be generated; however, in the present invention, the polyester (A) may contain such polyesters, or the block polymer (C) may be obtained by directly allowing such polyesters to react with the component (B).

In the polycondensation reaction, a catalyst which promotes esterification reaction may be used and, as such a catalyst, a conventionally known catalyst, such as dibutyl tin oxide, tetraalkyl titanate, zirconium acetate or zinc acetate, can be employed. In cases where a derivative such as a carboxylic acid ester, metal carboxylate or carboxylic acid halide is used in place of the dicarboxylic acid of the aliphatic dicarboxylic acid and the aromatic dicarboxylic acid, after the derivative and the diol are allowed to react with each other, both ends of the resultant may be treated to be dicarboxylic acids, or the resultant may be directly subjected to the subsequent reaction for obtaining the block polymer (C) having a structure comprising carboxyl groups at both ends.

A preferred polyester (A), which is composed of a diol, an aliphatic dicarboxylic acid and an aromatic dicarboxylic acid and has carboxyl groups at both ends, may be any polyester as long as it reacts with the component (B) to form an ester bond and thereby constitutes the structure of the block polymer (C), and the carboxyl groups at both ends may be protected or modified, or may be in a precursor form. Further, in order to inhibit oxidation of the product during the reaction, an antioxidant such as a phenolic antioxidant may also be added to the reaction system.

The compound (B) having hydroxyl groups at both ends may be any compound as long as it reacts with the component (A) to form an ester bond and thereby constitutes the structure of the block polymer (C), and the hydroxyl groups at both ends may be protected or modified, or may be in a precursor form.

The block polymer (C) according to the present invention, which has a structure comprising carboxyl groups at both ends, contains a block constituted by the polyester (A) and a block constituted by the compound (B) and has a structure in which these blocks are repeatedly and alternately bound via ester bonds formed by carboxyl groups and hydroxyl groups. One example of the block polymer (C) is a block polymer having a structure represented by the following Formula (3):

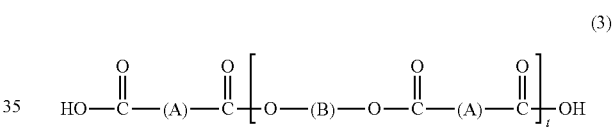

(3)

In the Formula (3), (A) represents a block constituted by the polyester (A) having carboxyl groups at both ends; (B) represents a block constituted by the compound (B) having hydroxyl groups at both ends; and t represents the number of repeating units, which is preferably 1 to 10, more preferably 1 to 7, most preferably 1 to 5.

In the block polymer (C), the block constituted by the polyester (A) may be partially replaced with a block constituted by a polyester consisting of only a diol and an aliphatic dicarboxylic acid or a block constituted by a polyester consisting of only a diol and an aromatic dicarboxylic acid.

The block polymer (C) having a structure comprising carboxyl groups at both ends can be obtained by allowing the polyester (A) having carboxyl groups at both ends and the compound (B) having hydroxyl groups at both ends to undergo a polycondensation reaction; however, as long as the block polymer (C) has a structure that is equivalent to the one in which the polyester (A) and the compound (B) are repeatedly and alternately bound via ester bonds formed by carboxyl groups and hydroxyl groups, it is not necessarily required that the block polymer (C) be synthesized from the polyester (A) and the compound (B).

As for the reaction ratio between the polyester (A) and the compound (B), by adjusting the amount of the polyester (A) to be (X+1) mol with respect to X mol of the compound (B), the block polymer (C) having carboxyl groups at both ends can be preferably obtained.

As for the reaction, after the completion of the synthesis reaction of the polyester (A), without the thus synthesized polyester (A) being isolated, the compound (B) may be added to the reaction system and allowed to react with the polyester (A) as is.

In the polycondensation reaction, a catalyst which promotes esterification reaction may be used and, as such a catalyst, a conventionally known catalyst, such as dibutyl tin oxide, tetraalkyl titanate, zirconium acetate or zinc acetate, can be employed. Further, in order to inhibit oxidation of the product during the reaction, an antioxidant such as a phenolic antioxidant may also be added to the reaction system.

Further, the polyester (A) may contain a polyester consisting of only a diol and an aliphatic dicarboxylic acid and/or a polyester consisting of only a diol and an aromatic dicarboxylic acid, and these polyesters may be directly allowed to react with the compound (B) to obtain the block polymer (C).

In addition to the block constituted by the polyester (A) and the block constituted by the compound (B), the block polymer (C) may also contain, in its structure, a block constituted by a polyester consisting of only a diol and an aliphatic dicarboxylic acid and/or a block constituted by a polyester consisting of only a diol and an aromatic dicarboxylic acid.

It is preferred that the polymer compound (E) according to the present invention has a structure in which the block polymer (C) having a structure comprising carboxyl groups at both ends and the compound (D) having a reactive functional group are bound via an ester bond or an amide bond that is formed by a terminal carboxyl group of the block polymer (C) and a reactive group of the compound (D) having a reactive functional group. That is, when the compound (D) having a reactive functional group is the polyepoxy compound (D1) having two or more epoxy groups, an ester bond is formed by a terminal carboxyl group of the block polymer (C) and an epoxy group of the polyethoxy compound (D1); when the compound (D) having a reactive functional group is the polyhydric alcohol compound (D2) having three or more hydroxyl groups, an ester bond is formed by a terminal carboxyl group of the block polymer (C) and a hydroxyl group of the polyhydric alcohol compound (D2); and, when the compound (D) having a reactive functional group is the polyamine compound (D3) having two or more amino groups, an amide bond is formed by a terminal carboxyl group of the block polymer (C) and an amino group of the polyamine compound (D3).

The polymer compound (E) may further contain an ester bond or an amide bond that is formed by a carboxyl group of the polyester (A) and a reactive group of the compound (D) having a reactive functional group. That is, when the compound (D) having a reactive functional group is the polyepoxy compound (D1), the polymer compound (E) may contain an ester bond formed by a carboxyl group of the polyester (A) and an epoxy group of the polyepoxy compound (D1); when the compound (D) having a reactive functional group is the polyhydric alcohol compound (D2), the polymer compound (E) may contain an ester bond formed by a carboxyl group of the polyester (A) and a hydroxyl group of the polyhydric alcohol compound (D2); and, when the compound (D) having a reactive functional group is the polyamine compound (D3), the polymer compound (E) may contain an amide bond formed by a carboxyl group of the polyester (A) and an amino group of the polyamine compound (D3).

In order to obtain the polymer compound (E), when the compound (D) having a reactive functional group is the polyepoxy compound (D1), the carboxyl groups of the block polymer (C) and the epoxy groups of the polyepoxy compound (D1) can be allowed to react with each other. The number of the epoxy groups of the epoxy compound is preferably 0.5 to 5 equivalents, more preferably 0.5 to 1.5 equivalents, with respect to the number of the carboxyl groups of the block polymer (C) to be reacted. The reaction can be performed in a variety of solvents, or it may be performed in a molten state.

Further, in order to obtain the polymer compound (E), when the compound (D) having a reactive functional group is the polyhydric alcohol compound (D2), the carboxyl groups of the block polymer (C) and the hydroxyl groups of the polyhydric alcohol compound (D2) can be allowed to react with each other. The number of the hydroxyl groups of the polyhydric alcohol compound to be reacted is preferably 0.5 to 5.0 equivalents, more preferably 0.5 to 2.0 equivalents, with respect to the number of the carboxyl groups of the block polymer (C) to be reacted. The reaction can be performed in a variety of solvents, or it may be performed in a molten state.

Moreover, in order to obtain the polymer compound (E), when the compound (D) having a reactive functional group is the polyamine compound (D3), the carboxyl groups of the block polymer (C) and the amino groups of the polyamine compound (D3) can be allowed to react with each other. The number of the amino groups of the polyamine compound is preferably 0.5 to 5 equivalents, more preferably 0.5 to 1.5 equivalents, with respect to the number of the carboxyl groups of the block polymer (C) to be reacted. The reaction can be performed in a variety of solvents, or it may be performed in a molten state.

The amount of the polyepoxy compound (D1) having two or more reactive groups to be used in the reaction, that of the polyhydric alcohol compound (D2) having three or more hydroxyl groups to be used in the reaction, and that of the polyamine compound (D3) having two or more reactive groups to be used in the reaction are preferably 0.1 to 2.0 equivalents, more preferably 0.2 to 1.5 equivalents, with respect to the number of the carboxyl groups of the block polymer (C) to be reacted.

As for the reaction, after the completion of the synthesis reaction of the block polymer (C), without the thus synthesized block polymer (C) being isolated, the compound (D) having a reactive functional group may be added to the reaction system and allowed to react with the block polymer (C) as is. In this case, unreacted carboxyl groups of the polyester (A) used in an excess amount in the synthesis of the block polymer (C) may react with some of the reactive groups of the compound (D) having a reactive functional group to form ester bonds or amide bonds.

It is not necessarily required that a preferred polymer compound (E) of the present invention be synthesized from the block polymer (C) and the compound (D) having a reactive functional group, as long as the polymer compound (E) has a structure that is equivalent to the one in which the block polymer (C) having a structure comprising carboxyl groups at both ends and the compound (D) having a reactive functional group are bound via an ester bond or an amide bond that is formed by a carboxyl group of the block polymer (C) and a reactive group of the compound (D).

In the polymer compound (E) of the present invention, the block constituted by the polyester (A) has a number-average molecular weight of preferably 800 to 8,000, more preferably 1,000 to 6,000, still more preferably 2,000 to 4,000, in terms of polystyrene. In the polymer compound (E), the block constituted by the compound (B) having hydroxyl groups at both ends has a number-average molecular weight of preferably 400 to 6,000, more preferably 1,000 to 5,000, still more preferably 2,000 to 4,000, in terms of polystyrene. Further, in the polymer compound (E), the block constituted by the block polymer (C) having a structure comprising carboxyl groups at both ends has a number-average molecular weight of preferably 5,000 to 25,000, more preferably 7,000 to 17,000, still more preferably 9,000 to 13,000, in terms of polystyrene.

The polymer compound (E) of the present invention may also be obtained by preparing the polyester (A) from a diol, an aliphatic dicarboxylic acid and an aromatic dicarboxylic acid and subsequently allowing the polyester (A) to react with the compound (B) and/or the compound (D) having a reactive functional group, without isolating the polyester (A).

The amount of the polymer compound (E) to be incorporated is 3 to 20 parts by mass with respect to 100 parts by mass of the synthetic resin and, from the standpoints of antistaticity and inhibition of ion elution, it is preferably 5 to 18 parts by mass, more preferably 7 to 15 parts by mass. When the amount of the polymer compound (E) is less than 3 parts by mass, sufficient antistaticity cannot be obtained, whereas when the amount is greater than 20 parts by mass, the mechanical properties of the resin may be adversely affected.

Next, the alkali metal salt (F) used in the present invention will be described. The alkali metal salt (F) is incorporated for the purpose of imparting antistaticity to the resin composition of the present invention.

Examples of the alkali metal salt (F) include salts of organic acids and inorganic acids.

Examples of the alkali metal include lithium, sodium, potassium, cesium and rubidium. Examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid, and examples of the inorganic acids include hydrochloric acid, hydrobromic acid, sulfuric acid, sulfurous acid, phosphoric acid, phosphorous acid, polyphosphoric acid, nitric acid and perchloric acid. Thereamong, from the standpoint of antistatic properties, lithium, sodium and potassium are more preferred, and lithium and sodium are most preferred. Further, from the standpoint of antistatic properties, acetates, perchlorates, p-toluenesulfonates and dodecylbenzenesulfonates are preferred.

Specific examples of the alkali metal salt include lithium acetate, sodium acetate, potassium acetate, lithium chloride, sodium chloride, potassium chloride, lithium phosphate, sodium phosphate, potassium phosphate, lithium sulfate, sodium sulfate, lithium perchlorate, sodium perchlorate, potassium perchlorate, lithium p-toluenesulfonate, sodium p-toluenesulfonate, potassium p-toluenesulfonate, lithium dodecylbenzenesulfonate, sodium dodecylbenzenesulfonate and potassium dodecylbenzenesulfonate. Thereamong, for example, lithium acetate, potassium acetate, lithium p-toluenesulfonate, sodium p-toluenesulfonate, lithium dodecylbenzenesulfonate, sodium dodecylbenzenesulfonate and lithium chloride are preferred.

From the standpoints of antistaticity and inhibition of ion elution, the amount of the alkali metal salt (F) to be incorporated is 0.1 to 5 parts by mass, preferably 0.3 to 2 parts by mass, more preferably 0.4 to 1 part by mass, with respect to 100 parts by mass of the synthetic resin. When the amount of the alkali metal salt is less than 0.1 parts by mass, sufficient antistaticity is not obtained, whereas when the amount is greater than 5 parts by mass, an ion is eluted in a large amount.

In the resin composition of the present invention, a Group II element salt may further be incorporated in such a range that does not impair the effects of the present invention. However, care must be taken since a Group II element salt also causes elution of its ion and thereby contaminates an electric/electronic component.

Examples of the Group II element salt include those of organic acids and inorganic acids, and examples of the Group II element include beryllium, magnesium, calcium, strontium and barium. Examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid, and examples of the inorganic acids include hydrochloric acid, hydrobromic acid, sulfuric acid, sulfurous acid, phosphoric acid, phosphorous acid, polyphosphoric acid, nitric acid and perchloric acid.

Further, in the resin composition of the present invention, a surfactant may also be incorporated in such a range that does not impair the effects of the present invention. As the surfactant, a nonionic, anionic, cationic or amphoteric surfactant can be used.

Examples of the nonionic surfactant include polyethylene glycol-type nonionic surfactants, such as higher alcohol ethylene oxide adducts, fatty acid ethylene oxide adducts, higher alkylamine ethylene oxide adducts and polypropylene glycol ethylene oxide adducts; and polyhydric alcohol-type nonionic surfactants, such as polyethylene oxides, glycerin fatty acid esters, pentaerythritol fatty acid esters, fatty acid esters of sorbitol or sorbitan, polyhydric alcohol alkyl ethers and alkanolamine aliphatic amides.

Examples of the anionic surfactant include carboxylates, such as alkali metal salts of higher fatty acids; sulfates such as higher alcohol sulfates and higher alkyl ether sulfates; sulfonates, such as alkylbenzenesulfonates, alkylsulfonates and paraffin sulfonates; and phosphates such as higher alcohol phosphates.

Examples of the cationic surfactant include quaternary ammonium salts such as alkyltrimethylammonium salts.

Examples of the amphoteric surfactant include amino acid-type amphoteric surfactants such as higher alkylaminopropionates; and betaine-type amphoteric surfactants, such as higher alkyl dimethylbetaines and higher alkyl dihydroxyethylbetaines. These surfactants may be used individually, or two or more thereof may be used in combination.

When a surfactant is incorporated, the amount thereof is preferably 0.1 to 5 parts by mass, more preferably 0.5 to 2 parts by mass, with respect to 100 parts by mass of the synthetic resin.

Further, a polymer-type antistatic agent may be incorporated into the resin composition of the present invention. As the polymer-type antistatic agent, for example, a known polymer-type antistatic agent such as a polyether ester amide can be used, and examples thereof include the polyether ester amide disclosed in Japanese Unexamined Patent Application Publication No. H7-10989 which comprises a polyoxyalkylene adduct of bisphenol A. Further, a block polymer having 2 to 50 repeating structures each composed of a polyolefin block and a hydrophilic polymer block can also be used, and examples thereof include the block polymer disclosed in the specification of U.S. Pat. No. 6,552,131.

When a polymer-type antistatic agent is incorporated, the amount thereof is preferably 0.1 to 10 parts by mass, more preferably 0.5 to 5 parts by mass, with respect to 100 parts by mass of the synthetic resin.

Still further, in the resin composition of the present invention, an ionic liquid may also be incorporated in such a range that does not impair the effects of the present invention. The ionic liquid is, for example, a normal temperature-molten salt having a melting point of not higher than room temperature and an initial electrical conductivity of 1 to 200 ms/cm, preferably 10 to 200 ms/cm, in which at least one cation or anion constituting the ionic liquid is an organic ion. Examples of such a normal temperature-molten salt include the one disclosed in WO 95/15572.

The cation constituting the ionic liquid is, for example, one selected from the group consisting of amidinium, pyridinium, pyrazolium and guanidinium cations. Thereamong, examples of the amidinium cation include the followings:
(1) imidazolinium cations
   those having 5 to 15 carbon atoms, such as 1,2,3,4-tetramethylimidazolinium and 1,3-dimethylimidazolinium;
(2) imidazolium cations
   those having 5 to 15 carbon atoms, such as 1,3-dimethylimidazolium and 1-ethyl-3-methylimidazolium;
(3) tetrahydropyrimidinium cations
   those having 6 to 15 carbon atoms, such as 1,3-dimethyl-1,4,5,6-tetrahydropyrimidinium and 1,2,3,4-tetramethyl-1,4,5,6-tetrahydropyrimidinium; and
(4) dihydropyrimidinium cations
   those having 6 to 20 carbon atoms, such as 1,3-dimethyl-1,4-dihydropyrimidinium, 1,3-dimethyl-1,6-dihydropyrimidinium, 8-methyl-1,8-diazabicyclo[5,4,0]-7,9-undecadienium and 8-methyl-1,8-diazabicyclo[5,4,0]-7,10-undecadienium.

Examples of the pyridinium cation include those having 6 to 20 carbon atoms, such as 3-methyl-1-propylpyridinium and 1-butyl-3,4-dimethylpyridinium.

Examples of the pyrazolium cation include those having 5 to 15 carbon atoms, such as 1,2-dimethylpyrazolium and 1-n-butyl-2-methylpyrazolium.

Examples of the guanidinium cation include the followings:
(1) guanidinium cations having an imidazolinium skeleton
   those having 8 to 15 carbon atoms, such as 2-dimethylamino-1,3,4-trimethylimidazolinium and 2-diethylamino-1,3,4-trimethylimidazolinium;
(2) guanidinium cations having an imidazolium skeleton
   those having 8 to 15 carbon atoms, such as 2-dimethylamino-1,3,4-trimethylimidazolium and 2-diethylamino-1,3,4-trimethylimidazolium;
(3) guanidinium cations having a tetrahydropyrimidinium skeleton
   those having 10 to 20 carbon atoms, such as 2-dimethylamino-1,3,4-trimethyl-1,4,5,6-tetrahydropyrimidinium and 2-diethylamino-1,3-dimethyl-4-ethyl-1,4,5,6-tetrahydropyrimidinium; and
(4) guanidinium cations having a dihydropyrimidinium skeleton
   those having 10 to 20 carbon atoms, such as 2-dimethylamino-1,3,4-trimethyl-1,4-dihydropyrimidinium, 2-dimethylamino-1,3,4-trimethyl-1,6-dihydropyrimidinium, 2-diethylamino-1,3-dimethyl-4-ethyl-1,4-dihydropyrimidinium and 2-diethylamino-1,3-dimethyl-4-ethyl-1,6-dihydropyrimidinium.

The above-described cations may be used individually, or two or more thereof may be used in combination. Thereamong, from the standpoint of antistatic properties, amidinium cations are preferred, imidazolium cations are more preferred, and 1-ethyl-3-methylimidazolium cation is particularly preferred.

In the ionic liquid, examples of the organic or inorganic acid constituting the anion include the followings. Examples of the organic acid include carboxylic acid, sulfuric acid ester, sulfonic acid and phosphoric acid ester, and examples of the inorganic acid include superacids (such as fluoroboric acid, tetrafluoroboric acid, perchloric acid, hexafluorophosphoric acid, hexafluoroantimonic acid and hexafluoroarsenic acid), phosphoric acid and boric acid. These organic and inorganic acids may be used individually, or two or more thereof may be used in combination.

Among these organic and inorganic acids, from the standpoint of the antistatic properties of the ionic liquid, acids forming a conjugate base of superacid or an anion other than a conjugate base of super acid, which allow the anion constituting the ionic liquid to have a Hammett acidity function $(-H_0)$ of 12 to 100, and mixtures of such acids are preferred.

Examples of the anion other than a conjugate base of superacid include halogen (such as fluorine, chlorine and bromine) ions, alkyl (C1-12) benzenesulfonic acid (such as p-toluenesulfonic acid and dodecylbenzenesulfonic acid) ions, and poly (n=1 to 25) fluoroalkanesulfonic acid (such as undecafluoropentanesulfonic acid) ions.

Examples of the superacid include those derived from a protonic acid or a combination of a protonic acid and a Lewis acid, and mixtures thereof. Examples of the protonic acid used as the superacid include bis(trifluoromethylsulfonyl)imidic acid, bis(pentafluoroethylsulfonyl)imidic acid, tris(trifluoromethylsulfonyl)methane, perchloric acid, fluorosulfonic acid, alkane (C1 to C30) sulfonic acids (such as methanesulfonic acid and dodecanesulfonic acid), poly (n=1 to 30) fluoroalkane (C1 to C30) sulfonic acid (such as trifluoromethanesulfonic acid, pentafluoroethanesulfonic acid, heptafluoropropanesulfonic acid, nonafluorobutanesulfonic acid, undecafluoropentanesulfonic acid and tridecafluorohexanesulfonic acid), fluoroboric acid, and tetrafluoroboric acid. Thereamong, from the standpoint of the ease of synthesis, fluoroboric acid, trifluoromethanesulfonic acid, bis(trifluoromethanesulfonyl)imidic acid and bis(pentafluoroethylsulfonyl)imidic acid are preferred.

Examples of the protonic acid used in combination with a Lewis acid include hydrogen halides (such as hydrogen fluoride, hydrogen chloride, hydrogen bromide and hydrogen iodide), perchloric acid, fluorosulfonic acid, methanesulfonic acid, trifluoromethanesulfonic acid, pentafluoroethanesulfonic acid, nonafluorobutanesulfonic acid, undecafluoropentanesulfonic acid, tridecafluorohexanesulfonic acid, and mixtures thereof. Thereamong, from the standpoint of the initial electrical conductivity of the ionic liquid, hydrogen fluoride is preferred.

Examples of the Lewis acid include boron trifluoride, phosphorus pentafluoride, antimony pentafluoride, arsenic pentafluoride, tantalum pentafluoride, and mixtures thereof. Thereamong, from the standpoint of the initial electrical conductivity of the ionic liquid, boron trifluoride and phosphorus pentafluoride are preferred.

The combination of a protonic acid and a Lewis acid may be any combination, and examples of a superacid derived therefrom include tetrafluoroboric acid, hexafluorophosphoric acid, hexafluorotantalic acid, hexafluoroantimonic acid, hexafluorotantalum sulfonic acid, tetrafluoroboric acid, hexafluorophosphoric acid, chlorotrifluoroboric acid, hexafluoroarsenic acid, and mixtures thereof.

Among the above-described anions, from the standpoint of the antistatic properties of the ionic liquid, conjugate bases of superacids (superacids derived from a protonic acid and superacids derived from a combination of a protonic acid and a Lewis acid) are preferred, and superacids derived from a protonic acid and conjugate bases of superacids derived from a protonic acid, boron trifluoride and/or phosphorus pentafluoride are more preferred.

Among the above-described ionic liquids, from the standpoint of the antistatic properties, amidinium cation-containing ionic liquids are preferred, 1-ethyl-3-methylimidazolium cation-containing ionic liquids are more preferred, and 1-ethyl-3-methylimidazolium-bis(trifluoromethanesulfonyl) imide is particularly preferred.

When an ionic liquid is incorporated, the amount thereof is preferably 0.01 to 5 parts by mass, more preferably 0.1 to 3 parts by mass, with respect to 100 parts by mass of the synthetic resin.

Yet still further, in the resin composition of the present invention, a compatibilizer may be incorporated in such a range that does not impair the effects of the present invention. By incorporating a compatibilizer, the compatibility of the antistatic agent component with other components and the resin component can be improved. Examples of the compatibilizer include modified vinyl polymers having at least one functional group (polar group) selected from the group consisting of a carboxyl group, an epoxy group, an amino group, a hydroxyl group and a polyoxyalkylene group, such as the polymer disclosed in Japanese Unexamined Patent Application Publication No. H3-258850, the sulfonyl group-containing modified vinyl polymer disclosed in Japanese Unexamined Patent Application Publication No. H6-345927 and block polymers comprising a polyolefin moiety and an aromatic vinyl polymer moiety.

When a compatibilizer is incorporated, the amount thereof is preferably 0.01 to 5 parts by mass, more preferably 0.1 to 3 parts by mass, with respect to 100 parts by mass of the synthetic resin.

Further, to the resin composition of the present invention, as required, a variety of additives such as a phenolic antioxidant, a phosphorus-based antioxidant, a thioether-based antioxidant, an ultraviolet absorber and a hindered amine-based light stabilizer may also be added in such a range that does not impair the effects of the present invention. By this, the resin composition of the present invention can be stabilized.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butyl-phenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[3-(3,5-di-tert-butyl-4-hydroxyphenyl)propionic acid methyl] methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the synthetic resin.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyObutane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl) oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the synthetic resin.

Examples of the thioether-based antioxidant include dialkyl thiodipropionates, such as dilauryl thiodipropionate, dimyristyl thiodipropionate and distearyl thiodipropionate; and pentaerythritol-tetra(β-alkylthiopropionic acid)esters. These thioether-based antioxidants are added in an amount of preferably 0.001 to 10 parts by mass, more preferably 0.05 to 5 parts by mass, with respect to 100 parts by mass of the synthetic resin.

Examples of the ultraviolet absorber include 2-hydroxybenzophenones, such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2'-hydroxyphenyl) benzotriazoles, such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol) and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl-α-cyano-β,β-diphenyl acrylate and methyl-2-cyano-3-methyl-3-(p-methoxyphenyl)acrylate; and triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the synthetic resin.

Examples of the hindered amine-based light stabilizer include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane and 1,6,11-tris[2,4-bis(N-butyl-N-(1,2,2,6,6-pentamethyl-4-piperidyl)amino)-s-triazine-6-yl]aminoundecane. These hindered amine-based light stabilizers are added in an amount of preferably 0.001 to 30 parts by mass, more preferably 0.05 to 10 parts by mass, with respect to 100 parts by mass of the synthetic resin.

It is preferred to further add a known neutralizer as required for the purpose of neutralizing residual catalyst contained in the synthetic resin such as a polyolefin-based resin. Examples of the neutralizer include fatty acid metal salts, such as calcium stearate, lithium stearate and sodium stearate; and fatty acid amide compounds, such as ethylene-bis(stearamide), ethylene-bis(12-hydroxystearamide) and stearic acid amide, and these neutralizers may be used in combination in the form of a mixture.

Further, to the resin composition of the present invention, as required, for example, a nucleating agent (e.g., an aromatic metal carboxylate, an alicyclic metal alkylcarboxylate, aluminump-tert-butylbenzoate, an aromatic metal phosphate, or a kind of dibenzylidene sorbitol), a metallic soap, a hydrotalcite, a triazine ring-containing compound, a metal hydroxide, a phosphoric acid ester-based flame retardant, a condensed phosphoric acid ester-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, and/or a foaming agent, may also be added.

Examples of the triazine ring-containing compound include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxide include magnesium hydroxide, aluminum hydroxide, calcium hydroxide, barium hydroxide, zinc hydroxide and KISUMA 5A (magnesium hydroxide, manufactured by Kyowa Chemical Industry Co., Ltd.).

Examples of the phosphate-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl) phosphate, 2-ethylhexyldiphenyl phosphate, t-butylphenyldiphenyl phosphate, bis(t-butylphenyl)phenyl phosphate, tris(t-butylphenyl)phosphate, isopropylphenyldiphenyl phosphate, bis(isopropylphenyl)diphenyl phosphate, and tris(isopropylphenyl)phosphate.

Examples of the condensed phosphoric acid ester-based flame retardant include 1,3-phenylene-bis(diphenylphosphate), 1,3-phenylene-bis(dixylenylphosphate), and bisphenol A-bis(diphenylphosphate).

Examples of the (poly)phosphate-based flame retardant include ammonium salts and amine salts of (poly)phosphoric acid, such as ammonium polyphosphate, melamine polyphosphate, piperazine polyphosphate, melamine pyrophosphate and piperazine pyrophosphate.

Examples of the above-described other inorganic flame retardant aid include inorganic compounds such as titanium oxide, aluminum oxide, magnesium oxide, hydrotalcites, talc and montmorillonite, and surface-treated products thereof. For example, a variety of commercially available products, such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by Kyowa Chemical Industry Co., Ltd.) and ALCAMIZER 4 (zinc-modified hydrotalcite: manufactured by Kyowa Chemical Industry Co., Ltd.), can be used. Examples of the above-described other organic flame retardant aid include pentaerythritol.

In addition, in the resin composition of the present invention, as required, an additive(s) normally used in synthetic resins, for example, a cross-linking agent, an anti-fogging agent, an anti-plate-out agent, a surface treatment agent, a plasticizer, a lubricant, a flame retardant, a fluorescent agent, an antifungal agent, an antibacterial agent, a foaming agent, a metal inactivator, a mold-release agent, a pigment, a processing aid, an antioxidant and/or a light stabilizer, may also be incorporated in such a range that does not impair the effects of the present invention.

The method of producing the resin composition of the present invention is not particularly restricted, and any commonly used method can be employed as long as the polymer compound (E), the alkali metal salt (F) and other arbitrary components are incorporated into a synthetic resin. For example, such components can be mixed and kneaded into the synthetic resin by roll kneading or bumper kneading, or using an extruder, a kneader or the like.

The polymer compound (E) may be directly added; however, as required, the polymer compound (E) may be impregnated into a carrier before the addition. In order to impregnate the polymer compound (E) into a carrier, the polymer compound (E) and the carrier can be directly heat-mixed, or a method in which the polymer compound (E) is diluted with an organic solvent before being impregnated into the carrier and the solvent is subsequently removed can be employed as required. As the carrier, one which is known as a filler or bulking agent of a synthetic resin, or a flame retardant or light stabilizer that is solid at normal temperature can be employed, and examples of such a carrier include calcium silicate powder, silica powder, talc powder, alumina powder, titanium oxide powder, and these carriers having chemically modified surface, as well as the below-described flame retardants and antioxidants that are solid. Thereamong, those carriers having chemically modified surface are preferred, and silica powder having a chemically modified surface is more preferred. These carriers have an average particle size of preferably 0.1 to 100 μm, more preferably 0.5 to 50 μm.

As a method of incorporating the polymer compound (E) into a resin component, the polymer compound (E) may be synthesized while kneading the block polymer (C) and the compound (D) having a reactive functional group into the resin component and, in this process, the alkali metal salt (F) may also be kneaded at the same time. Alternatively, the polymer compound (E) may be incorporated using a method of obtaining a molded article by mixing the polymer compound (E), the alkali metal salt (F) and the resin component at the time of molding such as injection molding, or a masterbatch of the alkali metal salt (F) and the synthetic resin, which has been produced in advance, may be incorporated.

Moreover, the polymer compound (E) and the alkali metal salt (F) may be mixed in advance and then incorporated into the synthetic resin, or the polymer compound (E) synthesized with an addition of the alkali metal salt (F) during reaction may be incorporated into the synthetic resin.

Next, the container and the packaging material of the present invention will be described.

The container and the packaging material of the present invention are obtained by molding the antistatic resin composition of the present invention. By molding the resin composition of the present invention, an antistatic resin molded article can be obtained. The molding method is not particularly restricted, and examples thereof include extrusion processing, calender processing, injection molding, rolling, compression molding, blow molding and rotational molding. Molded articles of various shapes, such as resin plates, sheets, films, bottles, fibers and special shape articles, can be produced by these methods. Such molded articles obtained from the resin composition of the present invention exhibit excellent antistatic performance with excellent persistence. Further, the molded articles also have wiping resistance.

Moreover, molded articles obtained from the resin composition of the present invention shows hardly any ion elution, and contamination with an ion can thus be inhibited. Particularly, in the molded articles of the present invention, when the molded articles are immersed in 100 g of 40° C. water for 2 hours, the amount of sodium and lithium ions eluting therefrom is preferably 12 ppb or less, more preferably 10 ppb or less, per 1 cm$^2$ of the surface area of each molded article.

The container and the packaging material that are obtained from the resin composition of the present invention are suitable as storage containers, transport containers and packaging materials of electrical/electronic components. Examples thereof include transport containers, storage containers, trays, casings and packaging materials of various parts and products, such as silicon wafers, hard disks, disk substrates, glass substrates, IC chips, semiconductors, optical memory disks, color filters, hard disk magnetic head elements and CCD elements.

EXAMPLES

The present invention will now be described in more detail by way of examples thereof; however, the present invention is not restricted thereto. It is noted here that, in the below-described Examples and Comparative Examples, "%" and "ppb" are all based on mass unless otherwise specified.

The polymer compounds (E) used in the present invention were produced in accordance with the below-described Production Examples 1 to 3. In Production Examples 1 to 3, the number-average molecular weight was determined by the below-described method of measuring the molecular weight.

<Method of Measuring Molecular Weight>

The number-average molecular weight (hereinafter, referred to as "Mn") was measured by gel permeation chromatography (GPC). The conditions of the Mn measurement were as follows.

Apparatus: GPC apparatus, manufactured by JASCO Corporation
Solvent: tetrahydrofuran
Standard substance: polystyrene
Detector: differential refractometer (RI detector)
Column stationary phase: SHODEX KF-804L, manufactured by Showa Denko K.K.
Column temperature: 40° C.
Sample concentration: 1 mg/1 mL
Flow rate: 0.8 mL/min
Injection volume: 100 μL Production Example 1-1

To a separable flask, 544 g of 1,4-cyclohexane dimethanol, 582 g (3.98 mol) of adipic acid, 0.7 g (0.01 mol) of phthalic anhydride and 0.5 g of an antioxidant (tetrakis[3-(3,5-di-tert-butyl-4-hydroxyphenyl)propionyloxymethyl] methane: ADK STAB AO-60, manufactured by ADEKA Corporation) were added, and these materials were allowed to polymerize for 4 hours under normal pressure with the temperature being slowly increased from 160° C. to 210° C., and then for 3 hours at 210° C. under reduced pressure, whereby a polyester (A)-1-1 was obtained. This polyester (A)-1-1 had an acid value of 28 and a number-average molecular weight (Mn) of 5,400 in terms of polystyrene.

Next, 600 g of the thus obtained polyester (A)-1-1, 300 g of polyethylene glycol having a number-average molecular weight of 4,000 as a compound (B)-1-1 having hydroxyl groups at both ends, 0.5 g of an antioxidant (ADK STAB AO-60) and 0.8 g of zirconium octylate were added and allowed to polymerize at 210° C. for 7 hours under reduced pressure, whereby a block polymer (C)-1-1 having a structure comprising carboxyl groups at both ends was obtained. This block polymer (C)-1-1 having a structure comprising carboxyl groups at both ends had an acid value of 9 and a number-average molecular weight (Mn) of 12,000 in terms of polystyrene.

To 300 g of the thus obtained block polymer (C)-1-1 having a structure comprising carboxyl groups at both ends, 5 g of bisphenol F diglycidyl ether was added as a polyepoxy compound (D1)-1, and the resulting mixture was allowed to polymerize at 240° C. for 3 hours under reduced pressure, whereby a polymer compound (E)-1-1 used in the present invention was obtained.

Production Example 1-2

To a separable flask, 591 g of ethylene oxide adduct of bisphenol A, 235 g (1.16 mol) of sebacic acid, 8 g (0.05 mol) of isophthalic acid and 0.5 g of an antioxidant (ADK STAB AO-60) were added, and these materials were allowed to polymerize for 4 hours under normal pressure with the temperature being slowly increased from 160° C. to 220° C. Then, 0.5 g of tetraisopropoxytitanate was further added, and the resulting mixture was allowed to polymerize at 220° C. for 5 hours under reduced pressure, whereby a polyester (A)-1-2 was obtained. This polyester (A)-1-2 had an acid value of 56 and a number-average molecular weight (Mn) of 2,300 in terms of polystyrene.

Next, 300 g of the thus obtained polyester (A)-1-2, 200 g of polyethylene glycol having a number-average molecular weight of 2,000 as a compound (B)-1-2 having hydroxyl groups at both ends, 0.5 g of an antioxidant (ADK STAB AO-60) and 0.5 g of zirconium acetate were added and allowed to polymerize at 220° C. for 8 hours under reduced pressure, whereby a block polymer (C)-1-2 having a structure comprising carboxyl groups at both ends was obtained. This block polymer (C)-1-2 having a structure comprising carboxyl groups at both ends had an acid value of 11 and a number-average molecular weight (Mn) of 10,500 in terms of polystyrene.

To 300 g of the thus obtained block polymer (C)-1-2, 11 g of dicyclopentadiene methanol diglycidyl ether was added as a polyepoxy compound (D1)-2, and the resulting mixture was allowed to polymerize at 240° C. for 3 hours under reduced pressure, whereby a polymer compound (E)-1-2 used in the present invention was obtained.

Production Example 1-3

To a separable flask, 370 g of 1,4-bis(β-hydroxyethoxy)benzene, 289 g (1.98 mol) of adipic acid, 8 g (0.05 mol) of isophthalic acid, 300 g of polyethylene glycol having a number-average molecular weight of 4,000 as a compound (B)-1-1 having hydroxyl groups at both ends, and 0.8 g of an antioxidant (ADK STAB AO-60) were added, and these materials were allowed to polymerize for 5 hours under normal pressure with the temperature being slowly increased from 180° C. to 220° C. Then, 0.8 g of tetraisopropoxytitanate was further added, and the resulting mixture was allowed to polymerize at 220° C. for 6 hours under reduced pressure, whereby a block polymer (C)-1-3 having a structure comprising carboxyl groups at both ends was obtained. This block polymer (C)-1-3 having a structure comprising carboxyl groups at both ends had an acid value of 9 and a number-average molecular weight (Mn) of 11,800 in terms of polystyrene.

To 300 g of the thus obtained block polymer (C)-1-3 having a structure comprising carboxyl groups at both ends, 5 g of dicyclopentadiene methanol diglycidyl ether as a polyepoxy compound (D1)-3 and 0.5 g of zirconium acetate were added, and the resulting mixture was allowed to polymerize at 240° C. for 4 hours under reduced pressure, whereby a polymer compound (E)-1-3 used in the present invention was obtained.

Examples 1-1 to 1-18 and Comparative Examples 1-1 to 1-23

Using resin compositions that were blended based on the respective formulations (parts by mass) shown in Tables 1 to 3 below, test pieces were obtained in accordance with the below-described conditions for preparing test pieces. For each of the thus obtained test pieces, the surface specific resistance (SR value) was measured, and a test for evaluation of resistance to wiping with water and a water resistance evaluation test were conducted as described below. Further, the test pieces were each subjected to an ion elution test under the below-described conditions. In the same manner, the resin compositions of Comparative Examples were prepared in accordance with the respective formulations shown in Tables 4 to 7 below and evaluated.

<Conditions for Preparing Test Pieces>

Using a biaxial extruder manufactured by Ikegai Corp. (PCM30, equipped with a 60-mesh screen), resin compositions that were blended based on the respective formulations shown in Tables below were each granulated under the conditions of 230° C. and 6 kg/hour to obtain pellets. Then, using a horizontal injection molding machine (NEX80, manufactured by Nissei Plastic Industrial Co., Ltd.), the thus obtained pellets were each molded at a resin temperature of 230° C. and a die temperature of 40° C. to 50° C. to obtain test pieces for the measurement of surface specific resistance, evaluation of resistance to wiping with water and evaluation of water resistance (100 mm×100 mm×3 mm) and test pieces for the ion elution test (80 mm×10 mm×4 mm, surface area=23.2 cm$^2$) were obtained.

<Method for Measuring Surface Specific Resistance (SR Value)>

The thus obtained test pieces (100 mm×100 mm×3 mm) were each molded and, immediately thereafter, stored under the conditions of a temperature of 25° C. and a humidity of 60% RH or 20% RH. After 1 day and 30 days of storage, under the same atmosphere, the surface specific resistance (Ω/□) of each molded test piece was measured using an R8340 resistance meter manufactured by Advantest Corporation under the conditions of an applied voltage of 100 V and a voltage application time of 1 minute. The measurement was performed at five spots, and an average thereof was determined.

<Test for Evaluation of Resistance to Wiping with Water>

The surface of each of the thus obtained test pieces (100 mm×100 mm×3 mm) was wiped with a waste cloth 50 times in running water and subsequently stored for 2 hours under the conditions of a temperature of 25° C. and a humidity of 60%. Thereafter, under the same atmosphere, the surface specific resistance (Ω/□) was measured using an R8340 resistance meter manufactured by Advantest Corporation under the conditions of an applied voltage of 100 V and a voltage application time of 1 minute. The measurement was performed at five spots, and an average thereof was determined.

<Test for Evaluation of Water Resistance>

The thus obtained test pieces (100 mm×100 mm×3 mm) were each immersed in 25° C. distilled water for 12 hours in such a manner that the surface was entirely submerged. Then, the test piece was dried with hot air (50° C.) for 3 hours and stored for 12 hours under the conditions of a temperature of 25° C. and a humidity of 60% RH. Thereafter, under the same atmosphere, the surface specific resistance ($\Omega/\square$) was measured using an R8340 resistance meter manufactured by Advantest Corporation under the conditions of an applied voltage of 100 V and a voltage application time of 1 minute. The measurement was performed at five spots, and an average thereof was determined.

<Ion Elution Test>

The thus obtained test pieces (80 mm×10 mm×4 mm, surface area=23.2 cm$^2$) were each immersed in 100 g of 40° C. water for 2 hours. Thereafter, each test piece was taken out of water, and the amount of eluted alkali metal was analyzed using an ICP emission spectrophotometer (SPS3500, manufactured by SII NanoTechnology Inc.). It is noted here that a value of the detection limit or less (less than 5 ppb) is denoted as "nd".

Further, from the thus obtained elution amount, the elution amount per 1 cm$^2$ of the surface area of each test piece was calculated.

TABLE 1

|  |  | Example 1-1 | Example 1-2 | Example 1-3 | Example 1-4 | Example 1-5 | Example 1-6 |
|---|---|---|---|---|---|---|---|
| Homopolypropylene*[1-1] |  | 100 | 100 | 100 | 100 | 100 | 100 |
| Polymer compound (E) | (E)-1-1 | 10 | 10 | 10 | 20 |  |  |
|  | (E)-1-2 |  |  |  |  | 10 |  |
|  | (E)-1-3 |  |  |  |  |  | 10 |
| Alkali metal salt | NaDBS*[1-2] | 0.5 |  |  | 1.0 |  |  |
|  | NaOAc*[1-3] |  | 0.5 |  |  |  | 0.5 |
|  | LiOTs*[1-4] |  |  | 0.5 |  | 0.5 |  |
| Surface specific resistance ($\Omega/\square$) (60% RH) | After 1 day | $8 \times 10^{10}$ | $4 \times 10^{11}$ | $3 \times 10^{11}$ | $1 \times 10^{9}$ | $4 \times 10^{11}$ | $3 \times 10^{11}$ |
|  | After 30 days | $8 \times 10^{10}$ | $4 \times 10^{11}$ | $3 \times 10^{11}$ | $1 \times 10^{9}$ | $4 \times 10^{11}$ | $3 \times 10^{11}$ |
| Surface specific resistance ($\Omega/\square$) (20% RH) | After 1 day | $9 \times 10^{11}$ | $2 \times 10^{12}$ | $2 \times 10^{12}$ | $8 \times 10^{9}$ | $9 \times 10^{11}$ | $8 \times 10^{11}$ |
|  | After 30 days | $9 \times 10^{11}$ | $2 \times 10^{12}$ | $2 \times 10^{12}$ | $8 \times 10^{9}$ | $1 \times 10^{12}$ | $8 \times 10^{11}$ |
| Evaluation of resistance to wiping with water ($\Omega/\square$) (60% RH) |  | $8 \times 10^{10}$ | $4 \times 10^{11}$ | $3 \times 10^{11}$ | $1 \times 10^{9}$ | $1 \times 10^{11}$ | $3 \times 10^{11}$ |
| Evaluation of water resistance ($\Omega/\square$) (60% RH) |  | $8 \times 10^{10}$ | $4 \times 10^{11}$ | $2 \times 10^{11}$ | $1 \times 10^{9}$ | $1 \times 10^{11}$ | $3 \times 10^{11}$ |
| Amount of eluted alkali metal (ppb) | Na | 14 | 19 | nd | 98 | 21 | 16 |
|  | Li | nd | nd | 25.6 | nd | nd | nd |
| Eluted amount per 1 cm$^2$ of surface area (ppb/cm$^2$) | Na | 0.6 | 0.8 | — | 4.2 | — | 0.7 |
|  | Li | — | — | 1.1 | — | 0.9 | — |

*[1-1]homopolypropylene, manufactured by Japan Polypropylene Corporation: trade name "H-700" (melt flow rate = 10 g/10 min)
*[1-2]sodium dodecylbenzenesulfonate
*[1-3]sodium acetate
*[1-4]lithium p-toluenesulfonate

TABLE 2

|  |  | Example 1-7 | Example 1-8 | Example 1-9 | Example 1-10 | Example 1-11 | Example 1-12 |
|---|---|---|---|---|---|---|---|
| High-impact polystyrene*[1-5] |  | 100 | 100 | 100 | 100 | 100 | 100 |
| Polymer compound (E) | (E)-1-1 | 10 | 15 | 15 |  |  |  |
|  | (E)-1-2 |  |  |  | 10 |  |  |
|  | (E)-1-3 |  |  |  |  | 10 | 15 |
| Alkali metal salt | NaDBS*[1-2] | 0.5 | 0.75 |  |  |  |  |
|  | NaOAc*[1-3] |  |  |  |  | 0.5 | 0.75 |
|  | LiOTs*[1-4] |  |  | 0.75 | 0.5 |  |  |
| Surface specific resistance ($\Omega/\square$) (60% RH) | After 1 day | $1 \times 10^{10}$ | $1 \times 10^{9}$ | $2 \times 10^{9}$ | $4 \times 10^{10}$ | $4 \times 10^{10}$ | $9 \times 10^{8}$ |
|  | After 30 days | $1 \times 10^{10}$ | $1 \times 10^{9}$ | $2 \times 10^{9}$ | $4 \times 10^{10}$ | $4 \times 10^{10}$ | $1 \times 10^{9}$ |
| Surface specific resistance ($\Omega/\square$) (20% RH) | After 1 day | $1 \times 10^{11}$ | $1 \times 10^{10}$ | $9 \times 10^{9}$ | $5 \times 10^{11}$ | $6 \times 10^{11}$ | $1 \times 10^{10}$ |
|  | After 30 days | $1 \times 10^{11}$ | $1 \times 10^{10}$ | $9 \times 10^{9}$ | $5 \times 10^{11}$ | $6 \times 10^{11}$ | $1 \times 10^{10}$ |
| Evaluation of resistance to wiping with water ($\Omega/\square$) (60% RH) |  | $1 \times 10^{10}$ | $1 \times 10^{9}$ | $3 \times 10^{9}$ | $4 \times 10^{10}$ | $4 \times 10^{10}$ | $1 \times 10^{9}$ |
| Evaluation of water resistance ($\Omega/\square$) (60% RH) |  | $1 \times 10^{10}$ | $1 \times 10^{9}$ | $2 \times 10^{9}$ | $4 \times 10^{10}$ | $4 \times 10^{10}$ | $1 \times 10^{9}$ |
| Amount of eluted alkali metal (ppb) | Na | 79 | 180 | nd | nd | 84 | 191 |
|  | Li | nd | nd | 205 | 119 | nd | nd |
| Eluted amount per 1 cm$^2$ of surface area (ppb/cm$^2$) | Na | 3.4 | 7.3 | — | — | 3.6 | 8.2 |
|  | Li | — | — | 8.8 | 5.1 | — | — |

*[1-5]high-impact polystyrene, manufactured by Toyo-Styrene Co., Ltd.: trade name "E640N" (melt flow rate = 2.7 g/10 min)

TABLE 3

|  |  | Example 1-13 | Example 1-14 | Example 1-15 | Example 1-16 | Example 1-17 | Example 1-18 |
|---|---|---|---|---|---|---|---|
| ABS resin[*1-6] |  | 100 | 100 | 100 | 100 | 100 | 100 |
| Polymer compound (E) | (E)-1-1 | 10 | 15 |  |  |  |  |
|  | (E)-1-2 |  |  | 10 | 15 | 20 |  |
|  | (E)-1-3 |  |  |  |  |  | 20 |
| Alkali metal salt | NaDBS[*1-2] | 0.5 | 0.75 |  |  |  |  |
|  | NaOAc[*1-3] |  |  |  |  |  | 1.0 |
|  | LiOTs[*1-4] |  |  | 0.5 | 0.75 | 1.0 |  |
| Surface specific resistance ($\Omega/\square$) (60% RH) | After 1 day | $8 \times 10^{11}$ | $1 \times 10^{10}$ | $7 \times 10^{11}$ | $2 \times 10^{10}$ | $2 \times 10^{9}$ | $1 \times 10^{9}$ |
|  | After 30 days | $8 \times 10^{11}$ | $1 \times 10^{10}$ | $7 \times 10^{11}$ | $2 \times 10^{10}$ | $2 \times 10^{9}$ | $1 \times 10^{9}$ |
| Surface specific resistance ($\Omega/\square$) (20% RH) | After 1 day | $5 \times 10^{12}$ | $1 \times 10^{11}$ | $5 \times 10^{12}$ | $2 \times 10^{11}$ | $9 \times 10^{9}$ | $1 \times 10^{10}$ |
|  | After 30 days | $4 \times 10^{12}$ | $1 \times 10^{11}$ | $5 \times 10^{12}$ | $2 \times 10^{11}$ | $9 \times 10^{9}$ | $1 \times 10^{10}$ |
| Evaluation of resistance to wiping with water ($\Omega/\square$) (60% RH) |  | $8 \times 10^{11}$ | $1 \times 10^{10}$ | $7 \times 10^{11}$ | $2 \times 10^{10}$ | $2 \times 10^{9}$ | $1 \times 10^{9}$ |
| Evaluation of water resistance ($\Omega/\square$) (60% RH) |  | $8 \times 10^{11}$ | $1 \times 10^{10}$ | $7 \times 10^{11}$ | $1 \times 10^{10}$ | $2 \times 10^{9}$ | $1 \times 10^{9}$ |
| Amount of eluted alkali metal (ppb) | Na | 23 | 68 | nd | nd | nd | 191 |
|  | Li | nd | nd | 7 | 68 | 196 | nd |
| Eluted amount per 1 cm² of surface area (ppb/cm²) | Na | 0.1 | 2.9 | — | — | — | 8.2 |
|  | Li | — | — | 0.3 | 2.9 | 8.4 | — |

[*1-6] ABS resin, manufactured by Techno Polymer Co., Ltd.: trade name "ABS110" (melt flow rate = 23 g/10 min)

TABLE 4

|  |  | Comparative Example 1-1 | Comparative Example 1-2 | Comparative Example 1-3 | Comparative Example 1-4 | Comparative Example 1-5 | Comparative Example 1-6 | Comparative Example 1-7 |
|---|---|---|---|---|---|---|---|---|
| Homopolypropylene[*1-1] |  | 100 | 100 | 100 | 100 | 100 | 100 | 100 |
| Polymer compound (E) | (E)-1-1 |  |  |  |  | 10 |  |  |
|  | (E)-1-2 |  |  |  |  |  | 10 |  |
|  | (E)-1-3 |  |  |  |  |  |  | 10 |
| Alkali metal salt | NaDBS[*1-2] |  | 0.5 |  |  |  |  |  |
|  | NaOAc[*1-3] |  |  | 0.5 |  |  |  |  |
|  | LiOTs[*1-4] |  |  |  | 0.5 |  |  |  |
| Surface specific resistance ($\Omega/\square$) (60% RH) | After 1 day | $4 \times 10^{15}$ | $3 \times 10^{15}$ | $4 \times 10^{15}$ | $4 \times 10^{15}$ | $6 \times 10^{12}$ | $8 \times 10^{12}$ | $8 \times 10^{12}$ |
|  | After 30 days | $4 \times 10^{15}$ | $4 \times 10^{15}$ | $4 \times 10^{15}$ | $4 \times 10^{15}$ | $6 \times 10^{12}$ | $8 \times 10^{12}$ | $8 \times 10^{12}$ |
| Surface specific resistance ($\Omega/\square$) (20% RH) | After 1 day | $5 \times 10^{16}$ | $7 \times 10^{16}$ | $5 \times 10^{16}$ | $5 \times 10^{16}$ | $2 \times 10^{13}$ | $4 \times 10^{13}$ | $4 \times 10^{13}$ |
|  | After 30 days | $6 \times 10^{16}$ | $5 \times 10^{16}$ | $5 \times 10^{15}$ | $6 \times 10^{16}$ | $2 \times 10^{13}$ | $4 \times 10^{13}$ | $4 \times 10^{13}$ |
| Evaluation of resistance to wiping with water ($\Omega/\square$) (60% RH) |  | $5 \times 10^{15}$ | $5 \times 10^{15}$ | $5 \times 10^{15}$ | $5 \times 10^{15}$ | $6 \times 10^{12}$ | $8 \times 10^{12}$ | $8 \times 10^{12}$ |
| Evaluation of water resistance ($\Omega/\square$) (60% RH) |  | $4 \times 10^{15}$ | $4 \times 10^{15}$ | $5 \times 10^{15}$ | $5 \times 10^{15}$ | $5 \times 10^{12}$ | $8 \times 10^{12}$ | $8 \times 10^{12}$ |
| Amount of eluted alkali metal (ppb) | Na | nd | 391 | 402 | nd | nd | nd | nd |
|  | Li | nd | nd | nd | 479 | nd | nd | nd |
| Eluted amount per 1 cm² of surface area (ppb/cm²) | Na | — | 16.9 | 17.3 | — | — | — | — |
|  | Li | — | — | — | 20.6 | — | — | — |

TABLE 5

|  |  | Comparative Example 1-8 | Comparative Example 1-9 | Comparative Example 1-10 | Comparative Example 1-11 | Comparative Example 1-12 |
|---|---|---|---|---|---|---|
| High-impact polystyrene[*1-5] |  | 100 | 100 | 100 | 100 | 100 |
| Polymer compound (E) | (E)-1-1 |  |  |  |  |  |
|  | (E)-1-2 |  |  |  |  |  |
|  | (E)-1-3 |  |  |  |  |  |
| Alkali metal salt | NaDBS[*1-2] |  | 0.5 | 1.0 |  |  |
|  | NaOAc[*1-3] |  |  |  | 0.5 |  |
|  | LiOTs[*1-4] |  |  |  |  | 0.5 |
| Surface specific resistance ($\Omega/\square$) (60% RH) | After 1 day | $3 \times 10^{17}$ | $1 \times 10^{17}$ | $3 \times 10^{14}$ | $3 \times 10^{17}$ | $3 \times 10^{17}$ |
|  | After 30 days | $3 \times 10^{17}$ | $1 \times 10^{16}$ | $1 \times 10^{13}$ | $3 \times 10^{17}$ | $1 \times 10^{17}$ |
| Surface specific resistance ($\Omega/\square$) (20% RH) | After 1 day | $5 \times 10^{17}$ | $5 \times 10^{17}$ | $7 \times 10^{15}$ | $5 \times 10^{17}$ | $5 \times 10^{17}$ |
|  | After 30 days | $5 \times 10^{17}$ | $2 \times 10^{17}$ | $1 \times 10^{15}$ | $6 \times 10^{17}$ | $5 \times 10^{17}$ |
| Evaluation of resistance to wiping with water ($\Omega/\square$) (60% RH) |  | $2 \times 10^{17}$ | $3 \times 10^{17}$ | $3 \times 10^{17}$ | $3 \times 10^{17}$ | $3 \times 10^{17}$ |
| Evaluation of water resistance ($\Omega/\square$) (60% RH) |  | $3 \times 10^{17}$ | $3 \times 10^{17}$ | $3 \times 10^{17}$ | $3 \times 10^{17}$ | $3 \times 10^{17}$ |

TABLE 5-continued

|  |  | Comparative Example 1-8 | Comparative Example 1-9 | Comparative Example 1-10 | Comparative Example 1-11 | Comparative Example 1-12 |
|---|---|---|---|---|---|---|
| Amount of eluted alkali metal (ppb) | Na | nd | 193 | 440 | 186 | nd |
|  | Li | nd | nd | nd | nd | 204 |
| Eluted amount per 1 cm² of surface area (ppb/cm²) | Na | — | 8.3 | 18.9 | 8.0 | — |
|  | Li | — | — | — | — | 8.8 |

TABLE 6

|  |  | Comparative Example 1-13 | Comparative Example 1-14 | Comparative Example 1-15 | Comparative Example 1-16 |
|---|---|---|---|---|---|
| High-impact polystyrene*[1-5] |  | 100 | 100 | 100 | 100 |
| Polymer compound (E) | (E)-1-1 | 10 |  |  |  |
|  | (E)-1-2 |  | 15 |  |  |
|  | (E)-1-3 |  |  | 10 | 15 |
| Alkali metal salt | NaDBS*[1-2] |  |  |  |  |
|  | NaOAc*[1-3] |  |  |  |  |
|  | LiOTs*[1-4] |  |  |  |  |
| Surface specific resistance (Ω/□) (60% RH) | After 1 day | $1 \times 10^{12}$ | $6 \times 10^{11}$ | $4 \times 10^{12}$ | $4 \times 10^{11}$ |
|  | After 30 days | $9 \times 10^{11}$ | $6 \times 10^{11}$ | $4 \times 10^{12}$ | $4 \times 10^{11}$ |
| Surface specific resistance (Ω/□) (20% RH) | After 1 day | $6 \times 10^{12}$ | $3 \times 10^{12}$ | $1 \times 10^{13}$ | $8 \times 10^{11}$ |
|  | After 30 days | $6 \times 10^{12}$ | $2 \times 10^{12}$ | $1 \times 10^{13}$ | $9 \times 10^{11}$ |
| Evaluation of resistance to wiping with water (Ω/□) (60% RH) |  | $1 \times 10^{12}$ | $5 \times 10^{11}$ | $4 \times 10^{12}$ | $4 \times 10^{11}$ |
| Evaluation of water resistance (Ω/□) (60% RH) |  | $1 \times 10^{12}$ | $5 \times 10^{11}$ | $4 \times 10^{12}$ | $4 \times 10^{11}$ |
| Amount of eluted alkali metal (ppb) | Na | nd | nd | nd | nd |
|  | Li | nd | nd | nd | nd |
| Eluted amount per 1 cm² of surface area (ppb/cm²) | Na | — | — | — | — |
|  | Li | — | — | — | — |

TABLE 7

|  |  | Comparative Example 1-17 | Comparative Example 1-18 | Comparative Example 1-19 | Comparative Example 1-20 | Comparative Example 1-21 | Comparative Example 1-22 | Comparative Example 1-23 |
|---|---|---|---|---|---|---|---|---|
| ABS resin*[1-6] |  | 100 | 100 | 100 | 100 | 100 | 100 | 100 |
| Polymer compound (E) | (E)-1-1 |  |  |  |  | 10 |  |  |
|  | (E)-1-2 |  |  |  |  |  | 10 |  |
|  | (E)-1-3 |  |  |  |  |  |  | 10 |
| Alkali metal salt | NaDBS*[1-2] |  | 0.5 |  |  |  |  |  |
|  | NaOAc*[1-3] |  |  | 0.5 |  |  |  |  |
|  | LiOTs*[1-4] |  |  |  | 0.5 |  |  |  |
| Surface specific resistance (Ω/□) (60% RH) | After 1 day | $4 \times 10^{16}$ | $8 \times 10^{15}$ | $7 \times 10^{15}$ | $8 \times 10^{15}$ | $8 \times 10^{12}$ | $8 \times 10^{12}$ | $8 \times 10^{12}$ |
|  | After 30 days | $3 \times 10^{16}$ | $8 \times 10^{15}$ | $7 \times 10^{15}$ | $8 \times 10^{15}$ | $8 \times 10^{12}$ | $8 \times 10^{12}$ | $8 \times 10^{12}$ |
| Surface specific resistance (Ω/□) (20% RH) | After 1 day | $7 \times 10^{16}$ | $5 \times 10^{16}$ | $6 \times 10^{16}$ | $6 \times 10^{16}$ | $6 \times 10^{13}$ | $6 \times 10^{13}$ | $6 \times 10^{13}$ |
|  | After 30 days | $7 \times 10^{16}$ | $5 \times 10^{16}$ | $6 \times 10^{16}$ | $6 \times 10^{16}$ | $6 \times 10^{13}$ | $5 \times 10^{13}$ | $6 \times 10^{13}$ |
| Evaluation of resistance to wiping with water (Ω/□) (60% RH) |  | $3 \times 10^{16}$ | $8 \times 10^{15}$ | $7 \times 10^{15}$ | $8 \times 10^{15}$ | $7 \times 10^{12}$ | $8 \times 10^{12}$ | $8 \times 10^{12}$ |
| Evaluation of water resistance (Ω/□) (60% RH) |  | $3 \times 10^{16}$ | $8 \times 10^{15}$ | $7 \times 10^{15}$ | $8 \times 10^{15}$ | $8 \times 10^{12}$ | $8 \times 10^{12}$ | $8 \times 10^{12}$ |
| Amount of eluted alkali metal (ppb) | Na | nd | 398 | 403 | nd | nd | nd | nd |
|  | Li | nd | nd | nd | 450 | nd | nd | nd |
| Eluted amount per 1 cm² of surface area (ppb/cm²) | Na | — | 17.1 | 17.3 | — | — | — | — |
|  | Li | — | — | — | 19.3 | — | — | — |

From the above, it is seen that the resin compositions according to the present invention had long-lasting and sufficient antistaticity and showed hardly any ion elution when made into molded articles. Therefore, the resin compositions according to the present invention are suitable for containers and packaging materials for storage and transport of electric/electronic components.

Production Example 2-1

To a separable flask, 544 g of 1,4-cyclohexane dimethanol, 582 g (3.98 mol) of adipic acid, 0.7 g (0.01 mol) of phthalic anhydride and 0.5 g of an antioxidant (tetrakis[3-(3,5-di-tert-butyl-4-hydroxyphenyl)propionyloxymethyl] methane: ADK STAB AO-60, manufactured by ADEKA Corporation) were added, and these materials were allowed to polymerize for 4 hours under normal pressure with the temperature being slowly increased from 160° C. to 210° C., and then for 3 hours at 210° C. under reduced pressure, whereby a polyester (A)-2-1 was obtained. This polyester (A)-2-1 had an acid value of 28 and a number-average molecular weight (Mn) of 5,400 in terms of polystyrene.

Next, 600 g of the thus obtained polyester (A)-2-1, 300 g of polyethylene glycol having a number-average molecular weight of 4,000 as a compound (B)-2-1 having hydroxyl groups at both ends, 0.5 g of an antioxidant (ADK STAB AO-60) and 0.8 g of zirconium octylate were added and allowed to polymerize at 210° C. for 7 hours under reduced pressure, whereby a block polymer (C)-2-1 having a structure comprising carboxyl groups at both ends was obtained. This block polymer (C)-2-1 having a structure comprising carboxyl groups at both ends had an acid value of 9 and a number-average molecular weight (Mn) of 12,000 in terms of polystyrene.

To 300 g of the thus obtained block polymer (C)-2-1 having a structure comprising carboxyl groups at both ends, 1.7 g of pentaerythritol was added as a polyhydric alcohol compound (D2)-1, and the resulting mixture was allowed to polymerize at 240° C. for 5 hours under reduced pressure, whereby a polymer compound (E)-2-1 used in the present invention was obtained.

Production Example 2-2

To a separable flask, 370 g of 1,4-bis(β-hydroxyethoxy)benzene, 289 g (1.98 mol) of adipic acid, 9 g (0.04 mol) of 2,6-naphthalenedicarboxylic acid, 300 g of polyethylene glycol having a number-average molecular weight of 4,000 as a compound (B)-2-1 having hydroxyl groups at both ends, and 0.8 g of an antioxidant (ADK STAB AO-60) were added, and these materials were allowed to polymerize for 5 hours under normal pressure with the temperature being slowly increased from 180° C. to 220° C. Then, 0.8 g of tetraisopropoxytitanate was further added, and the resulting mixture was allowed to polymerize at 220° C. for 6 hours under reduced pressure, whereby a block polymer (C)-2-2 having a structure comprising carboxyl groups at both ends was obtained. This block polymer (C)-2-2 having a structure comprising carboxyl groups at both ends had an acid value of 9 and a number-average molecular weight (Mn) of 11,800 in terms of polystyrene.

To 300 g of the thus obtained block polymer (C)-2-2 having a structure comprising carboxyl groups at both ends, 1.1 g of polypentaerythritol (hydroxyl value=13) was added as a polyhydric alcohol compound (D2)-2, and the resulting mixture was allowed to polymerize at 240° C. for 2 hours under reduced pressure, whereby a polymer compound (E)-2-2 used in the present invention was obtained.

Production Example 2-3

To a separable flask, 591 g of ethylene oxide adduct of bisphenol A, 235 g (1.16 mol) of sebacic acid, 8 g (0.05 mol) of isophthalic acid and 0.5 g of an antioxidant (ADK STAB AO-60) were added, and these materials were allowed to polymerize for 4 hours under normal pressure with the temperature being slowly increased from 160° C. to 220° C. Then, 0.5 g of tetraisopropoxytitanate was further added, and the resulting mixture was allowed to polymerize at 220° C. for 5 hours under reduced pressure, whereby a polyester (A)-2-3 was obtained. This polyester (A)-2-3 had an acid value of 56 and a number-average molecular weight (Mn) of 2,300 in terms of polystyrene.

Next, 300 g of the thus obtained polyester (A)-2-3, 200 g of polyethylene glycol having a number-average molecular weight of 2,000 as a compound (B)-2-2 having hydroxyl groups at both ends, 0.5 g of an antioxidant (ADK STAB AO-60) and 0.5 g of zirconium acetate were added and allowed to polymerize at 220° C. for 8 hours under reduced pressure, whereby a block polymer (C)-2-3 having a structure comprising carboxyl groups at both ends was obtained. This block polymer (C)-2-3 having a structure comprising carboxyl groups at both ends had an acid value of 11 and a number-average molecular weight (Mn) of 10,500 in terms of polystyrene.

To 300 g of the thus obtained block polymer (C)-2-3, 3.0 g of trimethylolpropane as a polyhydric alcohol compound (D2)-3 and 3.9 g of zirconium acetate were added, and the resulting mixture was allowed to polymerize at 240° C. for 4 hours under reduced pressure, whereby a polymer compound (E)-2-3 used in the present invention was obtained.

Examples 2-1 to 2-18 and Comparative Examples 2-1 to 2-23

Using resin compositions that were blended based on the respective formulations (parts by mass) shown in Tables 8 to 10 below, test pieces were obtained in the same manner as in Example 1-1 and the like and subjected to the measurement of the surface specific resistance (SR value), the test for evaluation of resistance to wiping with water and the water resistance evaluation test. The test pieces were also subjected to an ion elution test under the below-described conditions. In the same manner, the resin compositions of Comparative Examples were prepared in accordance with the respective formulations shown in Tables 11 to 14 below and evaluated.

TABLE 8

| | | Example 2-1 | Example 2-2 | Example 2-3 | Example 2-4 | Example 2-5 | Example 2-6 |
|---|---|---|---|---|---|---|---|
| Homopolypropylene*[2-1] | | 100 | 100 | 100 | 100 | 100 | 100 |
| Polymer compound (E) | (E)-2-1 | 10 | 10 | 10 | 20 | | |
| | (E)-2-2 | | | | | 10 | |
| | (E)-2-3 | | | | | | 10 |
| Alkali metal salt | NaDBS*[2-2] | 0.5 | | | | | 0.5 |
| | NaOAc*[2-3] | | 0.5 | | 1.0 | | |
| | LiOTs*[2-4] | | | 0.5 | | 0.5 | |
| Surface specific resistance (Ω/□) (60% RH) | After 1 day | $1 \times 10^{11}$ | $6 \times 10^{10}$ | $2 \times 10^{11}$ | $9 \times 10^{8}$ | $3 \times 10^{11}$ | $8 \times 10^{10}$ |
| | After 30 days | $1 \times 10^{11}$ | $6 \times 10^{10}$ | $2 \times 10^{11}$ | $9 \times 10^{8}$ | $3 \times 10^{11}$ | $8 \times 10^{10}$ |
| Surface specific resistance (Ω/□) (20% RH) | After 1 day | $3 \times 10^{12}$ | $8 \times 10^{11}$ | $4 \times 10^{12}$ | $7 \times 10^{9}$ | $3 \times 10^{12}$ | $8 \times 10^{11}$ |
| | After 30 days | $3 \times 10^{12}$ | $8 \times 10^{11}$ | $4 \times 10^{12}$ | $7 \times 10^{9}$ | $3 \times 10^{12}$ | $8 \times 10^{11}$ |

TABLE 8-continued

|  |  | Example 2-1 | Example 2-2 | Example 2-3 | Example 2-4 | Example 2-5 | Example 2-6 |
|---|---|---|---|---|---|---|---|
| Evaluation of resistance to wiping with water ($\Omega/\square$) (60% RH) | | $1 \times 10^{11}$ | $6 \times 10^{10}$ | $2 \times 10^{11}$ | $9 \times 10^{8}$ | $3 \times 10^{11}$ | $8 \times 10^{10}$ |
| Evaluation of water resistance ($\Omega/\square$) (60% RH) | | $1 \times 10^{11}$ | $6 \times 10^{0}$ | $2 \times 10^{11}$ | $9 \times 10^{8}$ | $3 \times 10^{11}$ | $8 \times 10^{10}$ |
| Amount of eluted alkali metal (ppb) | Na | 12 | 21 | nd | 105 | nd | 19 |
| | Li | nd | nd | 24 | nd | 23 | nd |
| Eluted amount per 1 cm$^2$ of surface area (ppb/cm$^2$) | Na | 0.5 | 0.9 | — | 4.5 | — | 0.8 |
| | Li | — | — | 1.0 | — | 1.0 | — |

*[2-1] homopolypropylene, manufactured by Japan Polypropylene Corporation: trade name "H-700" (melt flow rate = 10 g/10 min)
*[2-2] sodium dodecylbenzenesulfonate
*[2-3] sodium chloride
*[2-4] lithium p-toluenesulfonate

TABLE 9

|  |  | Example 2-7 | Example 2-8 | Example 2-9 | Example 2-10 | Example 2-11 | Example 2-12 |
|---|---|---|---|---|---|---|---|
| High-impact polystyrene*[2-5] | | 100 | 100 | 100 | 100 | 100 | 100 |
| Polymer compound (E) | (E)-2-1 | 10 | 15 | 15 | | | |
| | (E)-2-2 | | | | 10 | | |
| | (E)-2-3 | | | | | 10 | 15 |
| Alkali metal salt | NaDBS*[2-2] | | | | | 0.5 | 0.75 |
| | NaCl*[2-3] | 0.5 | 0.75 | | | | |
| | LiOTs*[2-4] | | | 0.75 | 0.5 | | |
| Surface specific resistance ($\Omega/\square$) (60% RH) | After 1 day | $1 \times 10^{10}$ | $9 \times 10^{8}$ | $2 \times 10^{9}$ | $6 \times 10^{10}$ | $2 \times 10^{10}$ | $2 \times 10^{9}$ |
| | After 30 days | $1 \times 10^{10}$ | $9 \times 10^{8}$ | $2 \times 10^{9}$ | $6 \times 10^{10}$ | $2 \times 10^{10}$ | $2 \times 10^{9}$ |
| Surface specific resistance ($\Omega/\square$) (20% RH) | After 1 day | $1 \times 10^{11}$ | $1 \times 10^{10}$ | $9 \times 10^{9}$ | $8 \times 10^{11}$ | $3 \times 10^{11}$ | $3 \times 10^{10}$ |
| | After 30 days | $1 \times 10^{11}$ | $1 \times 10^{10}$ | $9 \times 10^{9}$ | $8 \times 10^{11}$ | $3 \times 10^{11}$ | $3 \times 10^{10}$ |
| Evaluation of resistance to wiping with water ($\Omega/\square$) (60% RH) | | $1 \times 10^{10}$ | $9 \times 10^{8}$ | $3 \times 10^{9}$ | $6 \times 10^{10}$ | $2 \times 10^{10}$ | $2 \times 10^{9}$ |
| Evaluation of water resistance ($\Omega/\square$) (60% RH) | | $1 \times 10^{10}$ | $9 \times 10^{8}$ | $2 \times 10^{9}$ | $6 \times 10^{10}$ | $2 \times 10^{10}$ | $2 \times 10^{9}$ |
| Amount of eluted alkali metal (ppb) | Na | 74 | 173 | nd | nd | 77 | 177 |
| | Li | nd | nd | 205 | 119 | nd | nd |
| Eluted amount per 1 cm$^2$ of surface area (ppb/cm$^2$) | Na | 3.2 | 7.5 | — | — | 3.3 | 7.6 |
| | Li | — | — | 8.8 | 5.1 | — | — |

*[2-5] high-impact polystyrene, manufactured by Toyo-Styrene Co., Ltd.: trade name "E640N" (melt flow rate = 2.7 g/10 min)

TABLE 10

|  |  | Example 2-13 | Example 2-14 | Example 2-15 | Example 2-16 | Example 2-17 | Example 2-18 |
|---|---|---|---|---|---|---|---|
| ABS resin*[2-6] | | 100 | 100 | 100 | 100 | 100 | 100 |
| Polymer compound (E) | (E)-2-1 | 10 | 20 | | | | |
| | (E)-2-2 | | | 10 | 15 | 20 | |
| | (E)-2-3 | | | | | | 20 |
| Alkali metal salt | NaDBS*[2-2] | | | | | | 1.0 |
| | NaCl*[2-3] | 0.5 | 1.0 | | | | |
| | LiOTs*[2-4] | | | 0.5 | 0.75 | 1.0 | |
| Surface specific resistance ($\Omega/\square$) (60% RH) | After 1 day | $8 \times 10^{11}$ | $1 \times 10^{9}$ | $6 \times 10^{11}$ | $1 \times 10^{10}$ | $3 \times 10^{9}$ | $1 \times 10^{9}$ |
| | After 30 days | $8 \times 10^{11}$ | $1 \times 10^{9}$ | $6 \times 10^{11}$ | $1 \times 10^{10}$ | $3 \times 10^{9}$ | $1 \times 10^{9}$ |
| Surface specific resistance ($\Omega/\square$) (20% RH) | After 1 day | $7 \times 10^{12}$ | $1 \times 10^{10}$ | $5 \times 10^{12}$ | $2 \times 10^{11}$ | $3 \times 10^{10}$ | $1 \times 10^{10}$ |
| | After 30 days | $7 \times 10^{12}$ | $1 \times 10^{10}$ | $5 \times 10^{12}$ | $2 \times 10^{11}$ | $3 \times 10^{10}$ | $1 \times 10^{10}$ |
| Evaluation of resistance to wiping with water ($\Omega/\square$) (60% RH) | | $8 \times 10^{11}$ | $1 \times 10^{9}$ | $6 \times 10^{11}$ | $1 \times 10^{10}$ | $3 \times 10^{9}$ | $1 \times 10^{9}$ |
| Evaluation of water resistance ($\Omega/\square$) (60% RH) | | $8 \times 10^{11}$ | $1 \times 10^{9}$ | $6 \times 10^{11}$ | $1 \times 10^{10}$ | $3 \times 10^{9}$ | $1 \times 10^{9}$ |
| Amount of eluted alkali metal (ppb) | Na | 25 | 183 | nd | nd | nd | 197 |
| | Li | nd | nd | 7 | 77 | 169 | nd |
| Eluted amount per 1 cm$^2$ of surface area (ppb/cm$^2$) | Na | 1.1 | 7.9 | — | — | — | 8.5 |
| | Li | — | — | 0.3 | 3.3 | 7.3 | — |

*[2-6] ABS resin, manufactured by Techno Polymer Co., Ltd.: trade name "ABS110" (melt flow rate = 23 g/10 min)

TABLE 11

|  |  | Comparative Example 2-1 | Comparative Example 2-2 | Comparative Example 2-3 | Comparative Example 2-4 | Comparative Example 2-5 | Comparative Example 2-6 | Comparative Example 2-7 |
|---|---|---|---|---|---|---|---|---|
| Homopolypropylene*[2-1] | | 100 | 100 | 100 | 100 | 100 | 100 | 100 |
| Polymer compound (E) | (E)-2-1 | | | | | 10 | | |
| | (E)-2-2 | | | | | | 10 | |
| | (E)-2-3 | | | | | | | 10 |
| Alkali metal salt | NaDBS*[2-2] | | 0.5 | | | | | |
| | NaCl*[2-3] | | | 0.5 | | | | |
| | LiOTs*[2-4] | | | | 0.5 | | | |
| Surface specific resistance ($\Omega/\square$) (60% RH) | After 1 day | $4 \times 10^{15}$ | $3 \times 10^{15}$ | $6 \times 10^{15}$ | $4 \times 10^{15}$ | $8 \times 10^{12}$ | $8 \times 10^{12}$ | $7 \times 10^{12}$ |
| | After 30 days | $4 \times 10^{15}$ | $4 \times 10^{15}$ | $6 \times 10^{15}$ | $4 \times 10^{15}$ | $8 \times 10^{12}$ | $8 \times 10^{12}$ | $7 \times 10^{12}$ |
| Surface specific resistance ($\Omega/\square$) (20% RH) | After 1 day | $5 \times 10^{16}$ | $7 \times 10^{16}$ | $7 \times 10^{16}$ | $5 \times 10^{16}$ | $3 \times 10^{13}$ | $4 \times 10^{13}$ | $3 \times 10^{13}$ |
| | After 30 days | $6 \times 10^{16}$ | $5 \times 10^{16}$ | $7 \times 10^{15}$ | $6 \times 10^{16}$ | $3 \times 10^{13}$ | $4 \times 10^{13}$ | $3 \times 10^{13}$ |
| Evaluation of resistance to wiping with water ($\Omega/\square$) (60% RH) | | $5 \times 10^{15}$ | $5 \times 10^{15}$ | $8 \times 10^{15}$ | $5 \times 10^{15}$ | $8 \times 10^{12}$ | $8 \times 10^{12}$ | $7 \times 10^{12}$ |
| Evaluation of water resistance ($\Omega/\square$) (60% RH) | | $4 \times 10^{15}$ | $4 \times 10^{15}$ | $8 \times 10^{15}$ | $5 \times 10^{15}$ | $8 \times 10^{12}$ | $8 \times 10^{12}$ | $8 \times 10^{12}$ |
| Amount of eluted alkali metal (ppb) | Na | nd | 391 | 416 | nd | nd | nd | nd |
| | Li | nd | nd | nd | 479 | nd | nd | nd |
| Eluted amount per 1 cm$^2$ of surface area (ppb/cm$^2$) | Na | — | 16.9 | 17.9 | — | — | — | — |
| | Li | — | — | — | 20.6 | — | — | — |

TABLE 12

|  |  | Comparative Example 2-8 | Comparative Example 2-9 | Comparative Example 2-10 | Comparative Example 2-11 | Comparative Example 2-12 |
|---|---|---|---|---|---|---|
| High-impact polystyrene*[2-5] | | 100 | 100 | 100 | 100 | 100 |
| Polymer compound (E) | (E)-2-1 | | | | | |
| | (E)-2-2 | | | | | |
| | (E)-2-3 | | | | | |
| Alkali metal salt | NaDBS*[2-2] | | 0.5 | 1.0 | | |
| | NaCl*[2-3] | | | | 0.5 | |
| | LiOTs*[2-4] | | | | | 0.5 |
| Surface specific resistance ($\Omega/\square$) (60% RH) | After 1 day | $3 \times 10^{17}$ | $1 \times 10^{17}$ | $3 \times 10^{14}$ | $1 \times 10^{17}$ | $3 \times 10^{17}$ |
| | After 30 days | $3 \times 10^{17}$ | $1 \times 10^{16}$ | $1 \times 10^{13}$ | $1 \times 10^{17}$ | $1 \times 10^{17}$ |
| Surface specific resistance ($\Omega/\square$) (20% RH) | After 1 day | $5 \times 10^{17}$ | $5 \times 10^{17}$ | $7 \times 10^{15}$ | $7 \times 10^{17}$ | $5 \times 10^{17}$ |
| | After 30 days | $5 \times 10^{17}$ | $2 \times 10^{17}$ | $1 \times 10^{15}$ | $7 \times 10^{17}$ | $5 \times 10^{17}$ |
| Evaluation of resistance to wiping with water ($\Omega/\square$) (60% RH) | | $2 \times 10^{17}$ | $3 \times 10^{17}$ | $3 \times 10^{17}$ | $1 \times 10^{17}$ | $3 \times 10^{17}$ |
| Evaluation of water resistance ($\Omega/\square$) (60% RH) | | $3 \times 10^{17}$ | $3 \times 10^{17}$ | $3 \times 10^{17}$ | $1 \times 10^{17}$ | $3 \times 10^{17}$ |
| Amount of eluted alkali metal (ppb) | Na | nd | 193 | 440 | 193 | nd |
| | Li | nd | nd | nd | nd | 204 |
| Eluted amount per 1 cm$^2$ of surface area (ppb/cm$^2$) | Na | — | 8.3 | 18.9 | 8.3 | — |
| | Li | — | — | — | — | 8.8 |

TABLE 13

|  |  | Comparative Example 2-13 | Comparative Example 2-14 | Comparative Example 2-15 | Comparative Example 2-16 |
|---|---|---|---|---|---|
| High-impact polystyrene*[2-5] | | 100 | 100 | 100 | 100 |
| Polymer compound (E) | (E)-2-1 | 10 | | | |
| | (E)-2-2 | | 10 | | |
| | (E)-2-3 | | | 10 | 15 |
| Alkali metal salt | NaDBS*[2-2] | | | | |
| | NaCl*[2-3] | | | | |
| | LiOTs*[2-4] | | | | |
| Surface specific resistance ($\Omega/\square$) (60% RH) | After 1 day | $1 \times 10^{12}$ | $1 \times 10^{12}$ | $3 \times 10^{12}$ | $3 \times 10^{11}$ |
| | After 30 days | $1 \times 10^{12}$ | $1 \times 10^{12}$ | $3 \times 10^{12}$ | $3 \times 10^{11}$ |
| Surface specific resistance ($\Omega/\square$) (20% RH) | After 1 day | $6 \times 10^{12}$ | $5 \times 10^{12}$ | $9 \times 10^{12}$ | $8 \times 10^{11}$ |
| | After 30 days | $6 \times 10^{12}$ | $5 \times 10^{12}$ | $1 \times 10^{13}$ | $9 \times 10^{11}$ |
| Evaluation of resistance to wiping with water ($\Omega/\square$) (60% RH) | | $1 \times 10^{12}$ | $1 \times 10^{12}$ | $3 \times 10^{12}$ | $3 \times 10^{11}$ |
| Evaluation of water resistance ($\Omega/\square$) (60% RH) | | $1 \times 10^{12}$ | $1 \times 10^{12}$ | $3 \times 10^{12}$ | $3 \times 10^{11}$ |
| Amount of eluted alkali metal (ppb) | Na | nd | nd | nd | nd |
| | Li | nd | nd | nd | nd |
| Eluted amount per 1 cm$^2$ of surface area (ppb/cm$^2$) | Na | — | — | — | — |
| | Li | — | — | — | — |

TABLE 14

| | | Comparative Example 2-17 | Comparative Example 2-18 | Comparative Example 2-19 | Comparative Example 2-20 | Comparative Example 2-21 | Comparative Example 2-22 | Comparative Example 2-23 |
|---|---|---|---|---|---|---|---|---|
| ABS resin*[2-6] | | 100 | 100 | 100 | 100 | 100 | 100 | 100 |
| Polymer compound (E) | (E)-2-1 | | | | | 10 | | |
| | (E)-2-2 | | | | | | 10 | |
| | (E)-2-3 | | | | | | | 10 |
| Alkali metal salt | NaDBS*[2-2] | | 0.5 | | | | | |
| | NaCl*[2-3] | | | 0.5 | | | | |
| | LiOTs*[2-4] | | | | 0.5 | | | |
| Surface specific resistance ($\Omega/\square$) (60% RH) | After 1 day | $4 \times 10^{16}$ | $8 \times 10^{15}$ | $1 \times 10^{16}$ | $8 \times 10^{15}$ | $9 \times 10^{12}$ | $8 \times 10^{12}$ | $8 \times 10^{12}$ |
| | After 30 days | $3 \times 10^{16}$ | $8 \times 10^{15}$ | $1 \times 10^{16}$ | $8 \times 10^{15}$ | $9 \times 10^{12}$ | $8 \times 10^{12}$ | $8 \times 10^{12}$ |
| Surface specific resistance ($\Omega/\square$) (20% RH) | After 1 day | $7 \times 10^{16}$ | $5 \times 10^{16}$ | $8 \times 10^{16}$ | $6 \times 10^{16}$ | $7 \times 10^{13}$ | $8 \times 10^{13}$ | $8 \times 10^{13}$ |
| | After 30 days | $7 \times 10^{16}$ | $5 \times 10^{16}$ | $8 \times 10^{16}$ | $6 \times 10^{16}$ | $7 \times 10^{13}$ | $8 \times 10^{13}$ | $7 \times 10^{13}$ |
| Evaluation of resistance to wiping with water ($\Omega/\square$) (60% RH) | | $3 \times 10^{16}$ | $8 \times 10^{15}$ | $1 \times 10^{16}$ | $8 \times 10^{15}$ | $9 \times 10^{12}$ | $8 \times 10^{12}$ | $8 \times 10^{12}$ |
| Evaluation of water resistance ($\Omega/\square$) (60% RH) | | $3 \times 10^{16}$ | $8 \times 10^{15}$ | $1 \times 10^{16}$ | $8 \times 10^{15}$ | $1 \times 10^{13}$ | $8 \times 10^{12}$ | $8 \times 10^{12}$ |
| Amount of eluted alkali metal (ppb) | Na | nd | 398 | 381 | nd | nd | nd | nd |
| | Li | nd | nd | nd | 450 | nd | nd | nd |
| Eluted amount per 1 cm² of surface area (ppb/cm²) | Na | — | 17.1 | 16.4 | — | — | — | — |
| | Li | — | — | — | 19.3 | — | — | — |

From the above, it is seen that the resin compositions according to the present invention had long-lasting and sufficient antistaticity and showed hardly any ion elution when made into molded articles. Therefore, the resin compositions according to the present invention are suitable for containers and packaging materials for storage and transport of electric/electronic components.

Production Example 3-1

To a separable flask, 373 g of hydrogenated bisphenol A, 283 g of isophthalic acid, 0.6 g of an antioxidant (tetrakis [3-(3,5-di-tert-butyl-4-hydroxyphenyl)propionyloxymethyl] methane: ADK STAB AO-60, manufactured by ADEKA Corporation) and 0.6 g of zirconium acetate were added, and these materials were allowed to polymerize for 4 hours under normal pressure with the temperature being slowly increased from 190° C. to 230° C., and then for 5 hours at 230° C. under reduced pressure, whereby a polyester (A)-3-1 was obtained. This polyester (A)-3-1 had an acid value of 28 and a number-average molecular weight (Mn) of 4,300 in terms of polystyrene.

Next, 400 g of the thus obtained polyester (A)-3-1, 200 g of polyethylene glycol having a number-average molecular weight of 4,000 as a compound (B)-3-1 having hydroxyl groups at both ends, 0.6 g of an antioxidant (ADK STAB AO-60) and 0.6 g of zirconium acetate were added and allowed to polymerize at 220° C. for 7 hours under reduced pressure, whereby a block polymer (C)-3-1 having carboxyl groups at both ends was obtained. This block polymer (C)-3-1 having carboxyl groups at both ends had an acid value of 9 and a number-average molecular weight (Mn) of 13,100 in terms of polystyrene.

To 200 g of the thus obtained block polymer (C)-3-1 having carboxyl groups at both ends, 4.6 g of hexamethylene diamine was added as a polyamine compound (D3)-1, and the resulting mixture was allowed to polymerize at 240° C. for 2 hours under normal pressure, whereby a polymer compound (E)-3-1 used in the present invention was obtained.

Production Example 3-2

To 200 g of the block polymer (C)-3-1 having carboxyl groups at both ends which was obtained in Production Example 3-1, 5.5 g of xylylene diamine was added as a polyamine compound (D3)-2, and the resulting mixture was allowed to polymerize at 240° C. for 2 hours under normal pressure, whereby a polymer compound (E)-3-2 used in the present invention was obtained.

Examples 3-1 and 3-2

Using antistatic resin compositions that were blended based on the respective formulations shown in Table 15 below, test pieces were obtained in accordance with the below-described conditions for preparing test pieces. For each of the thus obtained test pieces, the surface specific resistance (SR value) was measured, and a test for evaluation of resistance to wiping with water was conducted as described below.

<Conditions for Preparing Test Pieces of Impact Copolymer Polypropylene Resin Compositions>

Using a biaxial extruder manufactured by Ikegai Corp. (PCM30, equipped with a 60-mesh screen), antistatic resin compositions that were blended based on the respective formulations shown in Tables below were each granulated under the conditions of 200° C. and 6 kg/hour to obtain pellets. Then, using a horizontal injection molding machine (NEX80, manufactured by Nissei Plastic Industrial Co., Ltd.), the thus obtained pellets were each molded at a resin temperature of 200° C. and a die temperature of 40° C. to obtain test pieces of 100 mm×100 mm×3 mm in size.

<Method for Measuring Surface Specific Resistance (SR Value)>

The thus obtained test pieces were each molded and, immediately thereafter, stored under the conditions of a temperature of 25° C. and a humidity of 60% RH. After 1 day and 30 days of storage, under the same atmosphere, the surface specific resistance ($\Omega/\square$) of each molded test piece was measured using an R8340 resistance meter manufactured by Advantest Corporation under the conditions of an applied voltage of 100 V and a voltage application time of 1 minute. The measurement was performed at five spots, and an average thereof was determined.

<Test for Evaluation of Resistance to Wiping with Water>

The surface of each of the thus obtained test pieces was wiped with a waste cloth 50 times in running water and subsequently stored for 2 hours under the conditions of a temperature of 25° C. and a humidity of 60%. Thereafter, under the same atmosphere, the surface specific resistance (Ω/☐) was measured using an R8340 resistance meter manufactured by Advantest Corporation under the conditions of an applied voltage of 100 V and a voltage application time of 1 minute. The measurement was performed at five spots, and an average thereof was determined.

TABLE 15

|  |  | Example 3-1 | Example 3-2 |
|---|---|---|---|
| Polymer compound | (E)-3-1 | 10 |  |
|  | (E)-3-2 |  | 10 |
| Alkali metal salt | NaDBS*[3-1] |  | 0.5 |
|  | potassium acetate |  |  |
|  | lithium chloride | 0.5 |  |
| Thermoplastic resin | ICP*[3-2] | 100 | 100 |
| Surface specific resistance | After 1 day | $3 \times 10^{11}$ | $9 \times 10^{11}$ |
| (Ω/☐) | After 30 days | $4 \times 10^{11}$ | $9 \times 10^{11}$ |
| Evaluation of resistance to wiping with water |  | $3 \times 10^{11}$ | $8 \times 10^{11}$ |

*[3-1]sodium dodecylbenzenesulfonate
*[3-2]impact copolymer polypropylene, manufactured by Japan Polypropylene Corporation: trade name "BC03B"

As shown in Tables above, it was confirmed that, according to the antistatic resin compositions of Examples, excellent antistatic effect was attained with an addition thereof in a small amount, and that the antistatic effect was not reduced with time or by wiping with water.

The invention claimed is:

1. An antistatic resin composition comprising, with respect to 100 parts by mass of a synthetic resin:
    3 to 20 parts by mass of at least one polymer compound (E); and
    0.1 to 5 parts by mass of at least one alkali metal salt (F), wherein
    said polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and a compound (D) having a reactive functional group are bound via ester bonds, or ester bonds and amide bonds:

    —CH₂—CH₂—O—    (1), wherein said polymer compound (E) has a structure in which a polyester (A), which is constituted by a diol, an aliphatic dicarboxylic acid and an aromatic dicarboxylic acid, said compound (B) and said compound (D) having a reactive functional group are bound via ester bonds, or ester bonds and amide bonds.

2. The antistatic resin composition according to claim 1, wherein said compound (D) having a reactive functional group is a polyepoxy compound (D1) having two or more epoxy groups.

3. The antistatic resin composition according to claim 1, wherein said compound (D) having a reactive functional group is a polyhydric alcohol compound (D2) having three or more hydroxyl groups.

4. The antistatic resin composition according to claim 1, wherein said compound (D) having a reactive functional group is a polyamine compound (D3) having two or more amino groups.

5. The antistatic resin composition according to claim 1, wherein said polymer compound (E) has a structure in which a block polymer (C) having carboxyl groups at both ends and said compound (D) having a reactive functional group are bound via an ester bond or an amide bond, said block polymer (C) comprising a block constituted by said polyester (A) and a block constituted by said compound (B) that are repeatedly and alternately bound via ester bonds.

6. The antistatic resin composition according to claim 1, wherein said polyester (A) constituting said polymer compound (E) has a structure comprising carboxyl groups at both ends.

7. The antistatic resin composition according to claim 5, wherein,
    in said polymer compound (E), said block constituted by said polyester (A) has a number-average molecular weight of 800 to 8,000 in terms polystyrene and said block constituted by said compound (B) has a number-average molecular weight of 400 to 6,000 in terms polystyrene, and
    said block polymer (C) has a number-average molecular weight of 5,000 to 25,000 in terms of polystyrene.

8. The antistatic resin composition according to claim 1, wherein said compound (B) constituting said polymer compound (E) is a polyethylene glycol.

9. The antistatic resin composition according to claim 1, wherein said synthetic resin is at least one selected from the group consisting of polyolefin-based resins and polystyrene-based resins.

10. A container produced by molding the antistatic resin composition according to claim 1.

11. The container according to claim 10, wherein, when said container is immersed in 100 g of 40° C. water for 2 hours, the amount of sodium and lithium ions eluting therefrom is 12 ppb or less per 1 cm² of the surface area.

12. A packaging material produced by molding the antistatic resin composition according to claim 1.

13. The packaging material according to claim 12, wherein, when said packaging material is immersed in 100 g of 40° C. water for 2 hours, the amount of sodium and lithium ions eluting therefrom is 12 ppb or less per 1 cm² of the surface area.

* * * * *